(12) United States Patent
Cahan et al.

(10) Patent No.: US 11,655,005 B2
(45) Date of Patent: May 23, 2023

(54) ELECTRONIC SHIFT CONTROL DEVICE FOR A BICYCLE DERAILLEUR

(71) Applicant: SRAM, LLC, Chicago, IL (US)

(72) Inventors: Rachel Cahan, Chicago, IL (US); Doug Mahoney, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/363,742

(22) Filed: Jun. 30, 2021

(65) Prior Publication Data

US 2021/0323636 A1 Oct. 21, 2021

Related U.S. Application Data

(63) Continuation of application No. 17/123,751, filed on Dec. 16, 2020, which is a continuation of application No. 15/868,550, filed on Jan. 11, 2018, now Pat. No. 10,894,578.

(51) Int. Cl.
*B62M 25/08* (2006.01)
*B62K 23/06* (2006.01)
*B62L 3/02* (2006.01)

(52) U.S. Cl.
CPC .............. *B62M 25/08* (2013.01); *B62K 23/06* (2013.01); *B62L 3/02* (2013.01); *B62L 3/023* (2013.01)

(58) Field of Classification Search
CPC .......... B62M 25/08; B62K 23/06; B62L 3/02; B62L 3/023
See application file for complete search history.

(56) References Cited

U.S. PATENT DOCUMENTS

| | | | | |
|---|---|---|---|---|
| 5,257,683 A | * | 11/1993 | Romano | ................. B62K 23/06 74/489 |
| 5,479,776 A | * | 1/1996 | Romano | ................. B62M 25/04 74/489 |
| 6,073,730 A | | 6/2000 | Abe | |
| 7,503,420 B2 | | 3/2009 | Fujii | |
| 7,703,350 B2 | | 4/2010 | Fujii | |
| 7,760,078 B2 | | 7/2010 | Miki et al. | |
| 8,286,529 B2 | | 10/2012 | Tetsuka | |
| 8,695,451 B2 | * | 4/2014 | Miki | ...................... B62K 23/06 74/502.2 |
| 8,869,649 B2 | | 10/2014 | Miki et al. | |

(Continued)

FOREIGN PATENT DOCUMENTS

DE 102007005120 A1 9/2007
DE 102015003775 A1 10/2015

(Continued)

*Primary Examiner* — Jake Cook

(57) ABSTRACT

A control device for a bicycle has a housing configured to be mountable to the bicycle and sized and shaped to be grasped by a user's hand and a battery receptacle positioned on the housing. The housing has a base portion and an extension portion. The base portion includes first and second ends, a downward facing side, an upward facing side, an inward facing side, an outward facing side, and a handlebar clamp disposed at the first end. A battery receptacle is positioned on a first side, which can be the downward facing side, of the base portion of the housing. An accessory port can be positioned on a second side of the base portion of the housing, different from the first side, and which can be the inward or outward facing side of the base portion of the housing.

13 Claims, 25 Drawing Sheets

(56) References Cited

U.S. PATENT DOCUMENTS

| | | |
|---|---|---|
| 8,909,424 B2 | 12/2014 | Jordan et al. |
| 8,931,365 B2 | 1/2015 | Fujii et al. |
| 8,950,287 B2 | 2/2015 | Watarai |
| 9,090,304 B2 | 7/2015 | Tetsuka |
| 2006/0070480 A1 | 4/2006 | Fujii |
| 2008/0210045 A1 | 9/2008 | De Perini et al. |
| 2009/0031841 A1 | 2/2009 | Tetsuka |
| 2009/0315692 A1 | 12/2009 | Miki et al. |
| 2010/0199798 A1 | 8/2010 | Uno |
| 2012/0152302 A1 | 6/2012 | Degraaff et al. |
| 2014/0015659 A1 | 1/2014 | Tetsuka |
| 2014/0070930 A1 | 3/2014 | Hara |
| 2014/0290411 A1 | 10/2014 | Kuroda |
| 2014/0352478 A1 | 12/2014 | Gao |
| 2015/0259025 A1 | 9/2015 | Sala et al. |
| 2015/0284049 A1 * | 10/2015 | Shipman ................ B62M 25/08 74/473.12 |
| 2017/0088234 A1 | 3/2017 | Komada et al. |
| 2017/0305394 A1 * | 10/2017 | Komatsu ................ B60T 7/102 |
| 2017/0305395 A1 | 10/2017 | Komatsu et al. |
| 2017/0305488 A1 | 10/2017 | Komatsu et al. |
| 2017/0305489 A1 | 10/2017 | Komatsu et al. |
| 2017/0305490 A1 | 10/2017 | Komatsu et al. |
| 2017/0305491 A1 | 10/2017 | Komatsu et al. |
| 2017/0305492 A1 | 10/2017 | Komatsu et al. |
| 2018/0127058 A1 * | 5/2018 | Rodgers ................ B62M 9/122 |

FOREIGN PATENT DOCUMENTS

| | | |
|---|---|---|
| DE | 102017002769 A1 | 10/2017 |
| DE | 102017002788 A1 | 10/2017 |
| DE | 102017002789 A1 | 10/2017 |
| DE | 102017002798 A1 | 10/2017 |
| DE | 102017002800 A1 | 10/2017 |
| DE | 102017007568 A1 | 3/2018 |
| TW | 201540600 A | 11/2015 |
| TW | M526765 U | 8/2016 |
| TW | 201643069 A | 12/2016 |
| TW | 201738146 A | 11/2017 |

* cited by examiner

ELECTRONIC SHIFT CONTROL DEVICE FOR A BICYCLE DERAILLEUR

The present application is a continuation of U.S. patent application Ser. No. 17/123,751, filed Dec. 16, 2020, which is a continuation of U.S. patent application Ser. No. 15/868,550, filed Jan. 11, 2018, now U.S. Pat. No. 10,894,578, issued Jan. 19, 2021 the contents of which are incorporated herein in their entirety.

BACKGROUND

Field of the Disclosure

The present disclosure is generally directed to a bicycle control device, and more particularly to a bicycle control device that includes a brake lever and an electronic shift control system for mounting to a handlebar of a bicycle.

Description of Related Art

For a typical electronic shift control device for a bicycle, the battery unit for the shift control system and the jacks for connecting remote shift control buttons are packaged together on a circuit board assembly. This increases the cost and limits the placement options for these components on the device.

Also, the battery is received in a receptacle of the battery unit that is closed by a battery cover. The battery cover is attached to the device using multiple small threaded fasteners. The small fasteners can make removal and reinstallation of the battery cover difficult. This also requires that a user or ride has the correct tool on hand whenever the battery must be removed and replaced.

Further, the remote connection jacks for connecting remote shift control buttons are not typically sealed against ingress of water or other contaminants, unless a separate plug is installed. Without a plug placed in the jacks, water and other contaminants can enter and reach the battery circuit board assembly and travel through the electrical cables to the shift button circuit board assembly. These components can become damaged when exposed to water and other contaminants.

The battery unit is not typically sealed against ingress of water or contaminants, unless the battery cover seal is installed. In some cases, the battery cover may be compromised, which may result in ingress of water or other contaminants even if the battery cover is in place. Without a proper batter cover seal, water and other contaminants can enter the battery unit and reach the battery circuit board assembly and can travel through the electrical cables to the shift button circuit board assembly. Again, these components can become damaged when exposed to water and other contaminants.

Still further, an electrical cable typically connects the shift button circuit board assembly to the battery and to the remote shift button jack circuit board assembly. The cable passes through the center of the hood or housing of the bicycle control device. Thus, either the cable is required to be connected after the cable is routed through the hood of the device, or the hood must be slotted to accept the cable. Adding a slot to the hood compromises the strength of the hood. Attaching the cable after the cable is routed through the hood can also be problematic. This is because the bicycle control device needs to be built and tested independent of the brake control assembly, which is a part of the device.

Also, a grommet seal is typically employed at the interface between the electrical cable and the shift control circuit board in the shift lever. This requires that the multiple pin connector that is used to secure the cable to the circuit board be installed after the cable is passed through the grommet. Thus, assembly of the bicycle control device can be rendered more difficult.

SUMMARY

A bicycle control device is disclosed herein and includes a brake lever and an electronic shift control system. The control device is mounted to a handlebar of a bicycle via a main hood or housing, which includes a bracket and creates or defines a grip. In one example, the brake control of the control device is for a hydraulic brake system. However, the disclosed bicycle control device can instead be configured using a mechanical cable brake system. The electronic shift control system of the control device has a primary actuating button that is located adjacent to the brake lever. The electronic shift control system is also configured to wirelessly transmit shift signals, has a battery unit, and includes inputs or jacks for connecting to remote shift control buttons located elsewhere on the bicycle.

In one example, according to the teachings of the present disclosure, a control device is mountable to a bicycle handlebar. The control device includes a housing sized and shaped to be grasped by a user's hand, a shift lever coupled to and movable relative to the housing, an electrical switch that can be actuated by movement of the shift lever, and a controller in communication with the electrical switch. The controller is configured to generate a signal in response to actuation of the electrical switch. The control device also includes a communication module configured to transmit the signal, a battery receptacle on a part of the housing, and a removable battery cover closing off the battery receptacle. The battery receptacle is configured to contain a battery for providing power to the controller and the communication module. The housing has a base portion and an extension portion. The base portion includes first and second ends, a downward facing side, an upward facing side, an inward facing side, an outward facing side, and a handlebar clamp disposed at the first end. When the control device is mounted to a bicycle handlebar, the base portion extends generally horizontally, and the extension portion extends forwardly of the base portion at the second end and is angled generally upwardly from the base portion. The battery receptacle opens to the downward facing side of the base portion.

In one example, the battery cover can be rotatable to remove from and install over the battery receptacle.

In one example, the battery cover can be circular and can include a seal, such as an O-ring, around a circumference thereof.

In one example, the battery receptacle can be provided within a battery case that can be received in a recess in the base portion of the housing and that can be fastened or secured to the housing.

In one example, the battery cover can be removable from and installable on a battery case that is attached to the housing.

In one example, the battery cover can be removable to access the battery receptacle and can be removed and installed without use of a tool.

In one example, the battery cover and a battery case can be provided as a part of a shift lever assembly that also includes the shift lever. The battery case can be connected to the shift lever by an electrical wire.

In one example, the control device can include one or more accessory jacks that are accessible on a side of the base portion of the housing other than the downward facing side.

In one example, the control device can include one or more accessory jacks that are accessible on either the inward facing side or the outward facing side of the base portion of the housing.

In one example, the control device can include a brake lever that can be pivotally mounted to the housing and operable to operate a brake system of a bicycle.

In one example, the shift lever can be a part of a shift lever assembly that is mounted to a brake lever of the control device. The shift lever can pivot in concert with the brake lever about a brake pivot axis and can be movable independent of the brake lever laterally about a shift lever pivot axis oriented perpendicular to or differently from the brake lever pivot axis.

In one example, the control device can include a controller that can be configured to generate a signal to change a shift position of a gear shifting mechanism of a bicycle responsive to actuation of an electrical switch.

In one example, the controller can be configured to generate a radio frequency signal to change a shift position of a gear shift mechanism of a bicycle responsive to actuation of an electrical switch. An antenna can be in radio frequency communication with the controller to send the radio frequency signal.

In one example, the control device can include an electrical switch, a controller, and an antenna, each of which can be a part of a shift lever assembly and can be carried on a portion of the shift lever.

In one example, the control device can include a shift lever assembly, which further includes a printed circuit board carried within a portion of the shift lever. An electrical switch, a controller, and an antenna can each be carried, at least in part, by a printed circuit board within the shift lever.

In one example, the battery receptacle can be provided within a battery case that is received in a recess in the base portion of the housing. The battery case can include a second cavity disposed opposite the battery receptacle on the battery case. The second cavity can face toward a recess in the housing.

In one example, the control device can further include a positive contact with a contact portion exposed within the battery receptacle and a connector portion exposed within the second cavity, a negative contact with a contact portion exposed within the battery receptacle and a connector portion exposed within the second cavity, and electrical wires connected to the connector portions of the first and second contacts exposed within the second cavity. The second cavity can be filled with an epoxy material, which can cover the electrical wires and the connector portions of the first and second contacts.

In one example, the communication module can be a wireless communication module configured to wirelessly transmit the signal.

In one example according to the teachings of the present disclosure, a control device for a bicycle includes a housing mountable to the bicycle and sized and shaped to be grasped by a user's hand, a battery receptacle positioned on the housing, and at least one accessory jack accessible on an exterior of the housing. The at least one accessory jack is configured to receive an electrical connector of a remote accessory spaced from the control device on the bicycle. The housing has a base portion and an extension portion. The base portion includes first and second ends, a downward facing side, an upward facing side, in inward facing side, an outward facing side, and a handlebar clamp disposed at the first end. When the control device is mounted to a bicycle handlebar, the base portion extends generally horizontally, and the extension portion extends forwardly of the base portion at the second end and is angled generally upwardly from the base portion. The battery receptacle is positioned on a first side selected from the downward, upward, inward, and outward facing sides of the base portion of the housing. The at least one accessory jack is positioned on a second side different than the first side and selected from the downward, upward, inward, and outward facing sides of the base portion of the housing.

In one example, the control device can include a shift lever assembly attached to the housing. The shift lever assembly can include a battery case attached to the first side of the housing. The battery receptacle can be defined within the battery case and can open to an exterior of the housing. A shift lever can be coupled to and movable relative to the housing. Movement of the shift lever can actuate an electrical switch. A controller can be in wireless communication with the electrical switch and can be connected to the battery case by a first electrical wire. The at least one accessory jack can be connected to the controller by a second electrical wire.

In one example, the housing can be configured to provide a first wire path whereby a first electrical wire is directed from a controller to the position of the battery receptacle and to provide a second wire path whereby a second electrical wire is directed from the controller to the position of the at least one accessory jack.

In one example, the control device can include a brake lever pivotally connected to and movable relative to the housing.

In one example, the control device can include a shift lever assembly with a shift lever that can be mounted to the brake lever. The shift lever can pivot in concert with the brake lever about a brake pivot axis and can be movable independent of the brake lever laterally about a shift lever pivot axis that is different from the brake lever pivot axis.

In one example, the control device can include a shift lever assembly that can include a printed circuit board housed within a cavity in a paddle end of a shift lever.

In one example, the at least one accessory jack can include a plurality of accessory jacks. The plurality of accessory jacks can each be connected to a controller of a shift lever assembly by a corresponding plurality of second electrical wires.

In one example, the control device can include a controller that can be configured to generate a signal to change a shift position of a gear shifting mechanism of a bicycle responsive to actuation of an electrical switch.

In one example, the battery receptacle can be positioned on the downward facing side of the base portion of the housing.

In one example, the at least one accessory jack can be positioned on the inward facing side or the outward facing side of the base portion of the housing.

In one example according to the teachings of the present disclosure, a control device is configured for operating an electromechanical gear shifting mechanism of a bicycle. The control device includes a housing mountable to a bicycle and a brake lever coupled to and pivotally movable relative to the housing. The brake lever has a contact surface on a part thereof, a shift lever movable in concert with the brake lever and movable relative to the housing and relative to the brake lever, and a backer provided on a receiving portion of the shift lever. The contact surface of the brake lever is disposed in contact with the backer.

In one example, the receiving portion can be a pocket provided on the shift lever.

In one example, the backer can be seated in a pocket on the shift lever and can have a friction reducing surface exposed to and in contact with the contact surface of the brake lever.

In one example, the backer can be seated in a pocket on the shift lever.

In one example, the backer can be captured between the contact surface of the brake lever and the receiving portion on the shift lever.

In one example, the backer can be made from a material different from the shift lever and can be attached to the shift lever.

In one example, the backer can be formed from a Teflon material.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A bicycle control device is disclosed herein that solves or improves upon one or more of the above-mentioned and/or other problems and disadvantages with prior known control devices. The disclosed bicycle control device includes a brake lever and an electronic shift control system. The control device is mounted to a handlebar of a bicycle. The brake control of the control device may be for operating a hydraulic brake system or a mechanical cable brake system. The electronic shift control system of the control device is also configured to wirelessly transmit shift signals, has a battery unit, and includes accessory ports, or jacks, for connecting to remote shift control devices or buttons located elsewhere on the bicycle. The accessory ports may be configured as input ports to receive input signals from the remote shift control devices.

Those having ordinary skill in the art should understand that the drawings and detailed description provided herein are for illustration only and do not limit the scope of the invention or the disclosure. The appended claims define the scope of the invention and the disclosure. The terms "first", "second," and the like, as well as "front", "rear," "left", "right", and the like are used for the sake of clarity. Such terms and similar terms are not used herein as terms of limitation. Further, such terms refer to bicycle mechanisms that are conventionally mounted to a bicycle and with the bicycle oriented and used in a standard manner, unless otherwise indicated.

Figure 1:
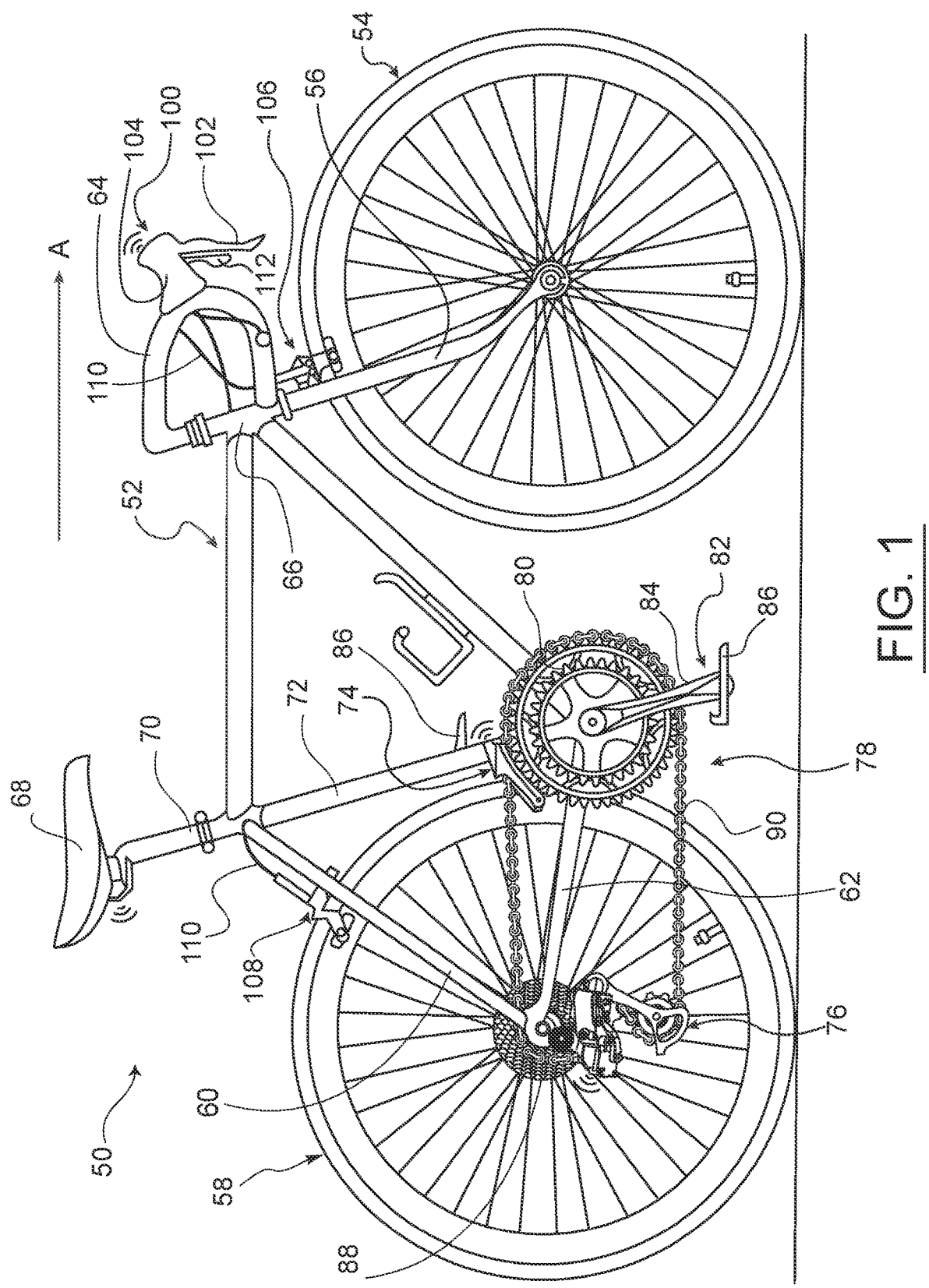
FIG. 1 shows a side view of a bicycle including a bicycle control device according to the present disclosure.

Turning now to the drawings, FIG. 1 depicts a bicycle 50 with a frame 52, a front wheel 54 coupled to a fork 56 of the frame, and a rear wheel 58 coupled to seat stays 60 and chain stays 62 of the frame. The wheels 54, 58 support the frame 52 above a surface on which the bicycle 50 can travel in a forward direction indicated by the arrow 'A'. The bicycle 50 has a drop-bar type handlebar 64 that is mounted to a head tube 66 of the frame 52. The bicycle 50 also has a seat 68 carried by a seat post 70 received in a seat tube 72 of the frame 50. The bicycle 50 may have one or both of a front gear changer 74 and a rear gear changer 76 mounted to the frame 52. The gear changers 74, 76 may be electromechanical derailleurs, for example. The bicycle 50 includes a multiple-geared drive train 78 with one or more chainrings 80 driven by a crank assembly 82, which has two crank arms 84 and two pedals, respectively 86. The chainrings 80 may be connected to a plurality of sprockets 88 at the rear wheel 58 by a chain 90. The bicycle 50 as described above is known in the art.

Referring to FIGS. 1-5, the bicycle 50 in the disclosed example has at least one bicycle control device 100, hereinafter the "control device 100", which can be mounted to the handlebar 64. In this example, the control device 100 includes a brake control element of a brake system. The brake control element includes a brake lever 102 that is movably connected to a hood or housing 104 of the device. The brake lever 102 operates components of the braking system of the bicycle 50. In one example, the brake system can include one or both of a hydraulic front brake mechanism 106 coupled to the front wheel 54 and a hydraulic rear brake mechanism 108 coupled to the rear wheel through hydraulic lines 110. As noted above, the brake system can instead be a mechanical cable type brake system. As described in greater detail below, the control device 100 also includes a shift control element of an electronic shift control system. The shift control element includes a shift lever assembly 112 for shifting the gears of the bicycle 50.

Referring to FIGS. 2-6, various exterior views are depicted of the control device 100, which is constructed according to one example of the present disclosure. The control device 100 is mountable to the handlebar 64. In one example, the housing 104 can incorporate and include a known type of clamp 120, which may be or include an adjustable band that extends around the handlebar. In one example, the bicycle 50 may include a pair of the control devices 100, one on each of the left and right sides of the handlebar 64, as is well known. One having ordinary skill in the art should understand that together the pair of control devices 100 may be configured to operate the respective front and rear electromechanical derailleurs 74, 76 and the respective front and rear brake mechanisms 106, 108. In one example, the pair of control devices 100 may be identical to one another.

Figure 6:
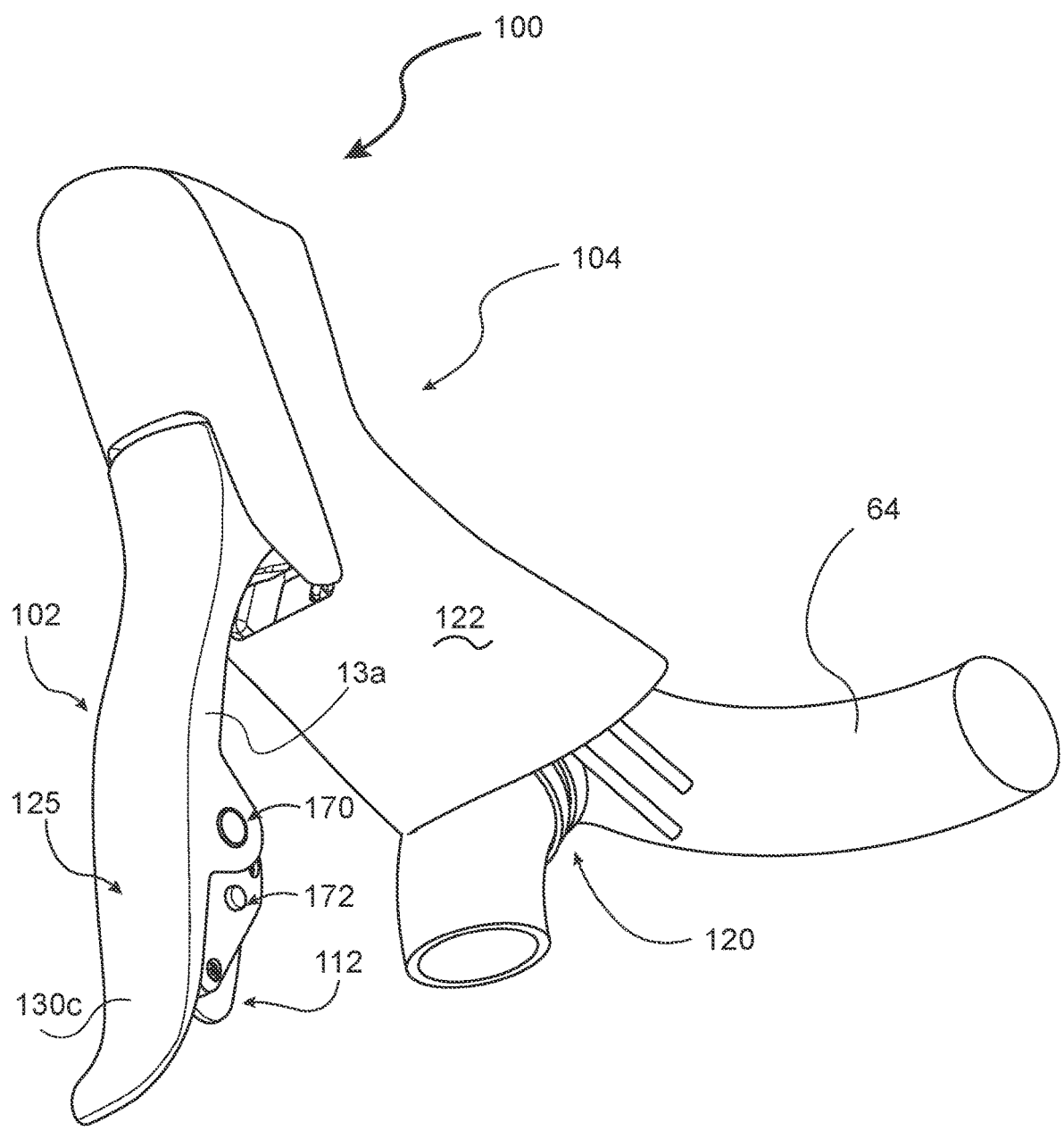
FIG. 6 shows an inside bottom perspective view of the bicycle control device of FIG. 2.
Figure 7:
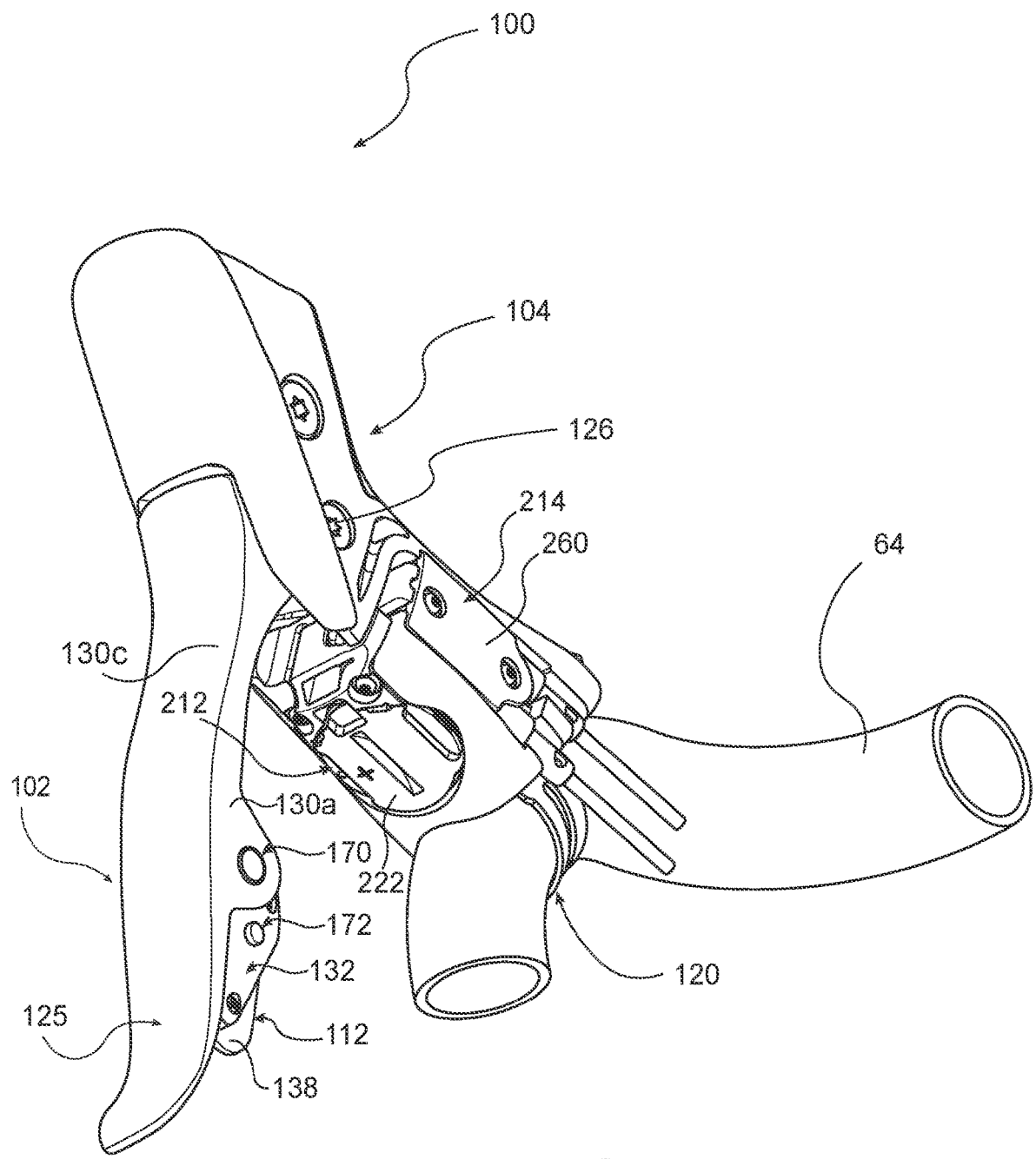
FIG. 7 shows the bicycle control device of FIG. 6, but with an outer cover removed.
Figure 8:
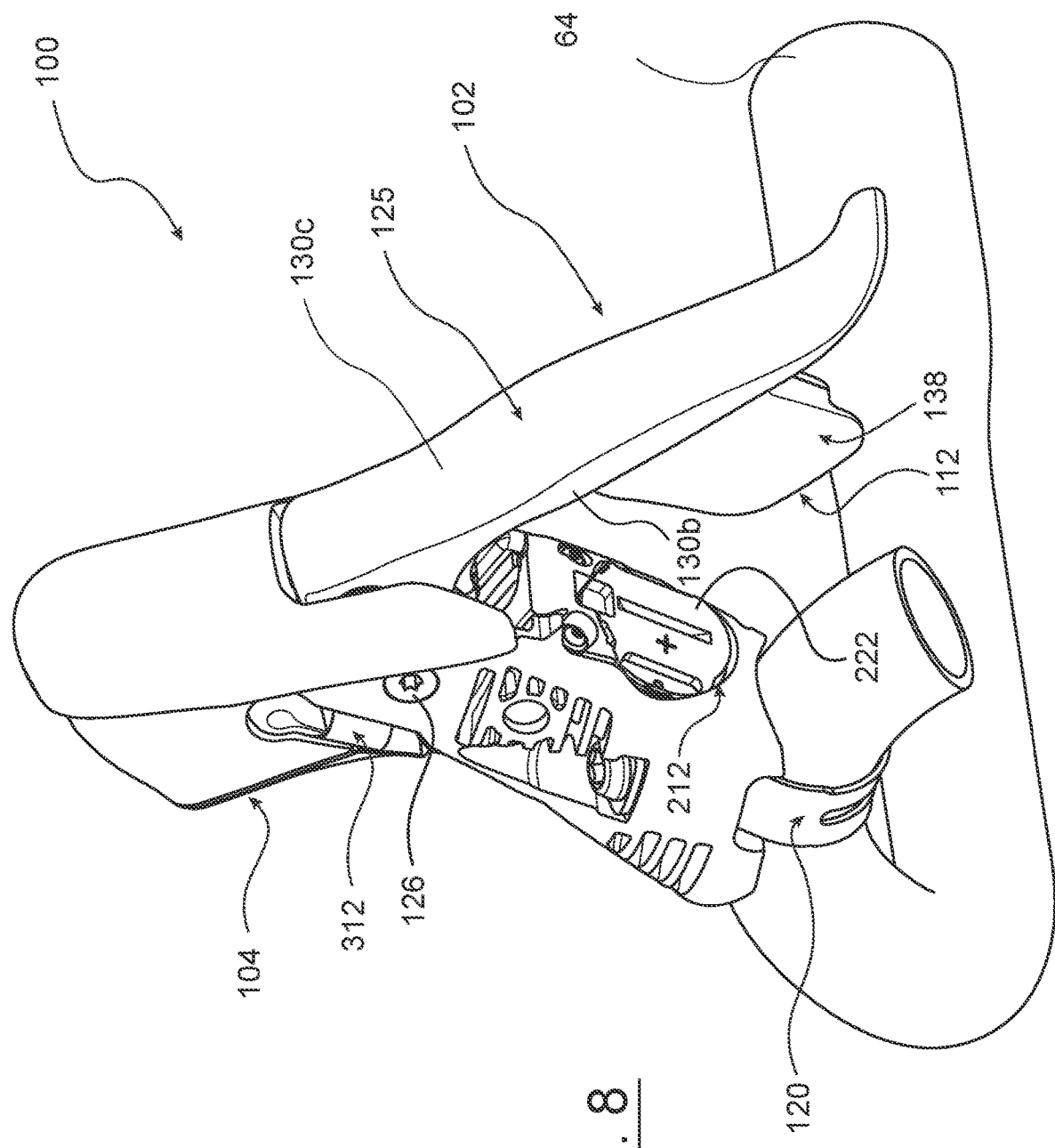
FIG. 8 shows an outside bottom perspective view of the bicycle control device of FIG. 7.

In the disclosed example, referring to FIGS. 6-8, the control device 100 includes a hood, i.e., the housing 104, which may be covered with an exterior or outer cover 122. The housing 104 is shaped and sized to be grasped by a hand of a user or rider and the outer cover 122 can be configured to closely follow and overlie the shape of the housing. The housing 104 and outer cover 122 can serve as a grip or can together be configured as a graspable portion of the control device 100. The housing 104 may be formed of any suitable material, such as for example, metal, plastic, and/or composite materials. The housing 100 is constructed to carry, house, and/or support the various components and mechanisms of the control elements of the brake system and the electronic shift control system, as described in greater detail below. The outer cover 122 may be made of any suitable material, such as natural and/or synthetic elastomeric materials and may be designed to present a comfortable interface with the user and to reduce the tendency to become detached or moved from its position on the exterior of the housing 100. For example, the outer cover 122 may be formed of a flexible thermoplastic elastomer (TPE) such as Santoprene™. The outer cover 122 may be configured to be removably attached to and held in position on the housing 104 using any known securement or attachment method.

Figure 9:
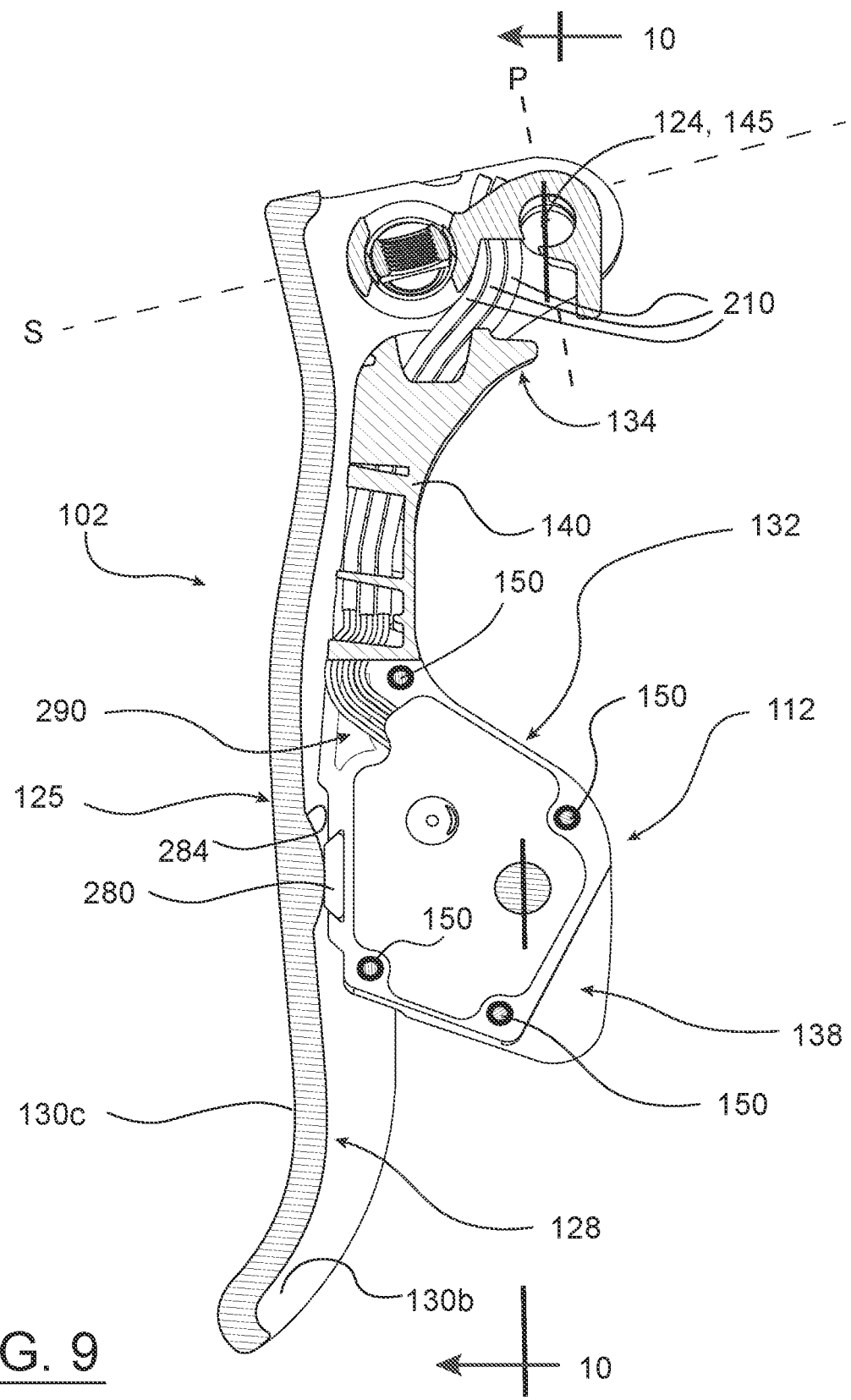
FIG. 9 shows a cross section taken along line 9-9 of the brake lever and shift lever assembly of the bicycle control device of FIG. 3.

In this example, referring to FIGS. 7-9 wherein the outer cover 122 has been removed, the brake lever 102 is pivotally or movably attached to the housing 104. The brake lever 102 may be attached to the housing 104 at or near the leading or front part of the housing so that the brake lever is spaced forward from the handlebar 64. The brake lever 102 may thus be pivotable relative to the housing 104 generally forward and rearward. The brake lever 102 may also be made of any suitable material such as metal, plastic, or composite materials. The brake lever 102 may include a pivot bore or holes 124 near the proximal end. The pivot holes 124 can be aligned with one another and define a pivot axis P that is oriented generally perpendicular to the lengthwise axis of a grip handle 125 of the brake lever 102. The brake lever 102 can be attached to the housing 100 by an axle 126, which may in the form of a pivot pin, a rod, a shaft, or the like, through the holes 124.

Figure 2:
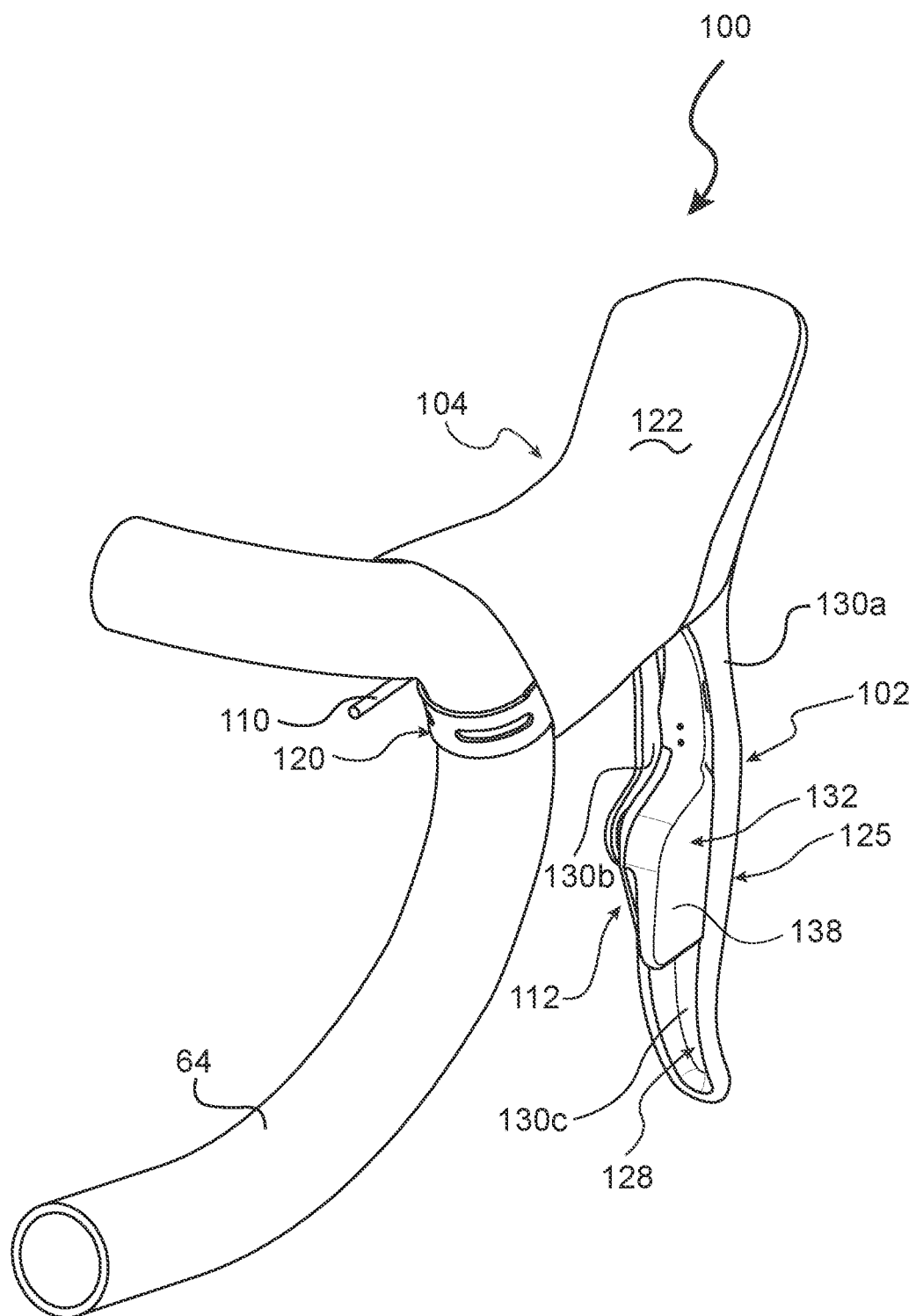
FIG. 2 shows a rear and outside perspective view of the bicycle control device and a portion of the handlebar of the bicycle depicted in FIG. 1.
Figure 3:
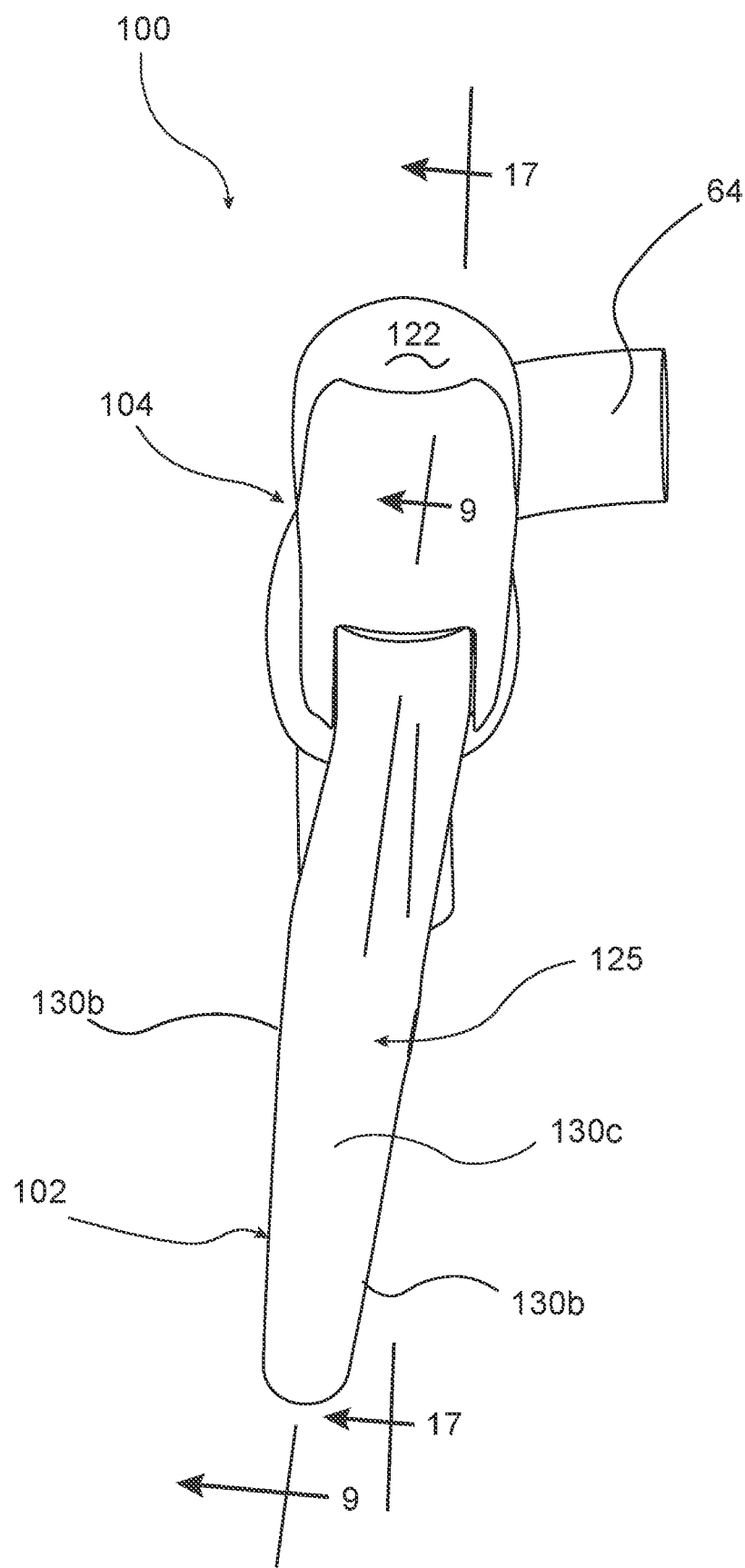
FIG. 3 shows a front view of the bicycle control device of FIG. 2.
Figure 4:
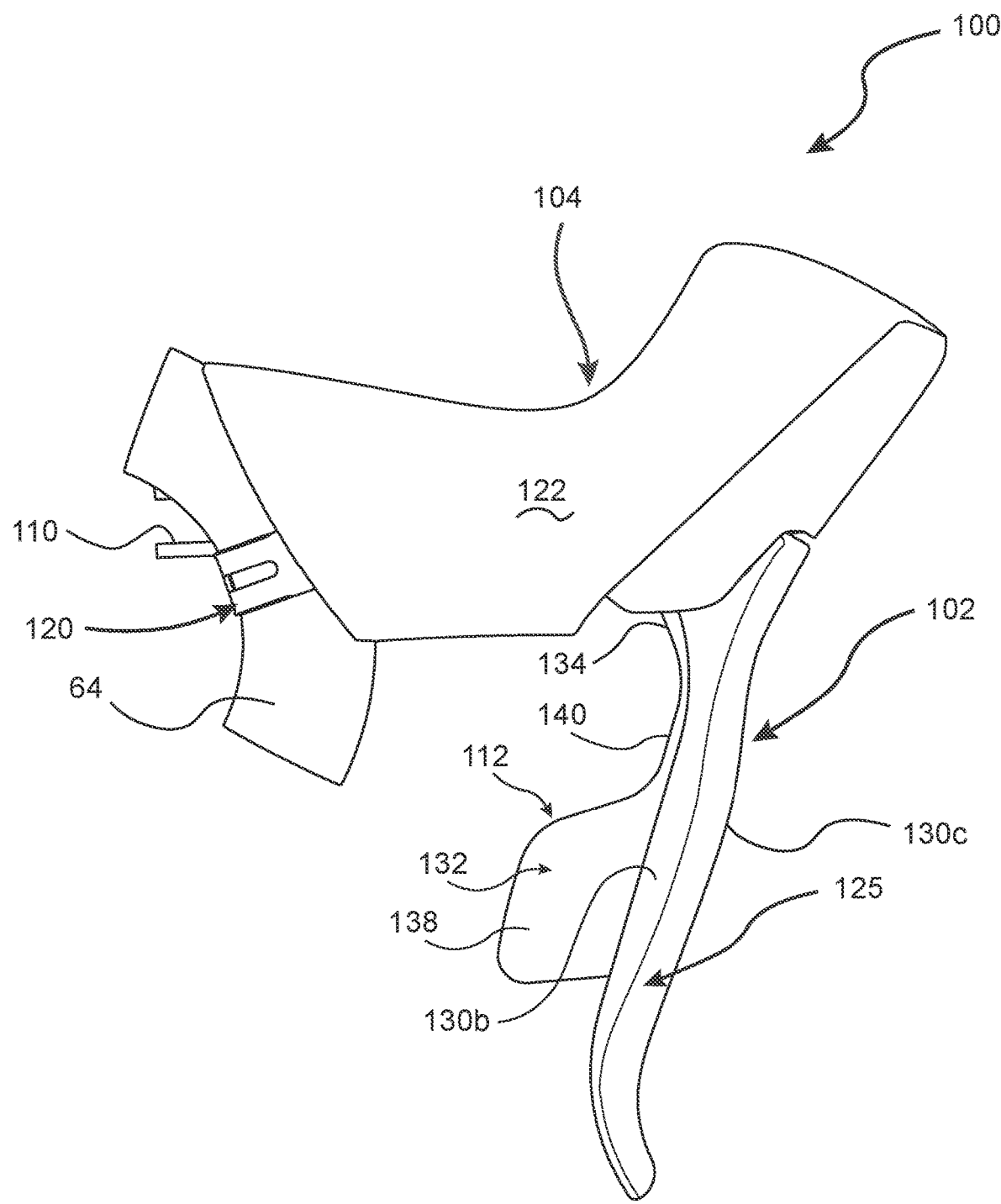
FIG. 4 shows an outside view of the bicycle control device of FIG. 2.
Figure 5:
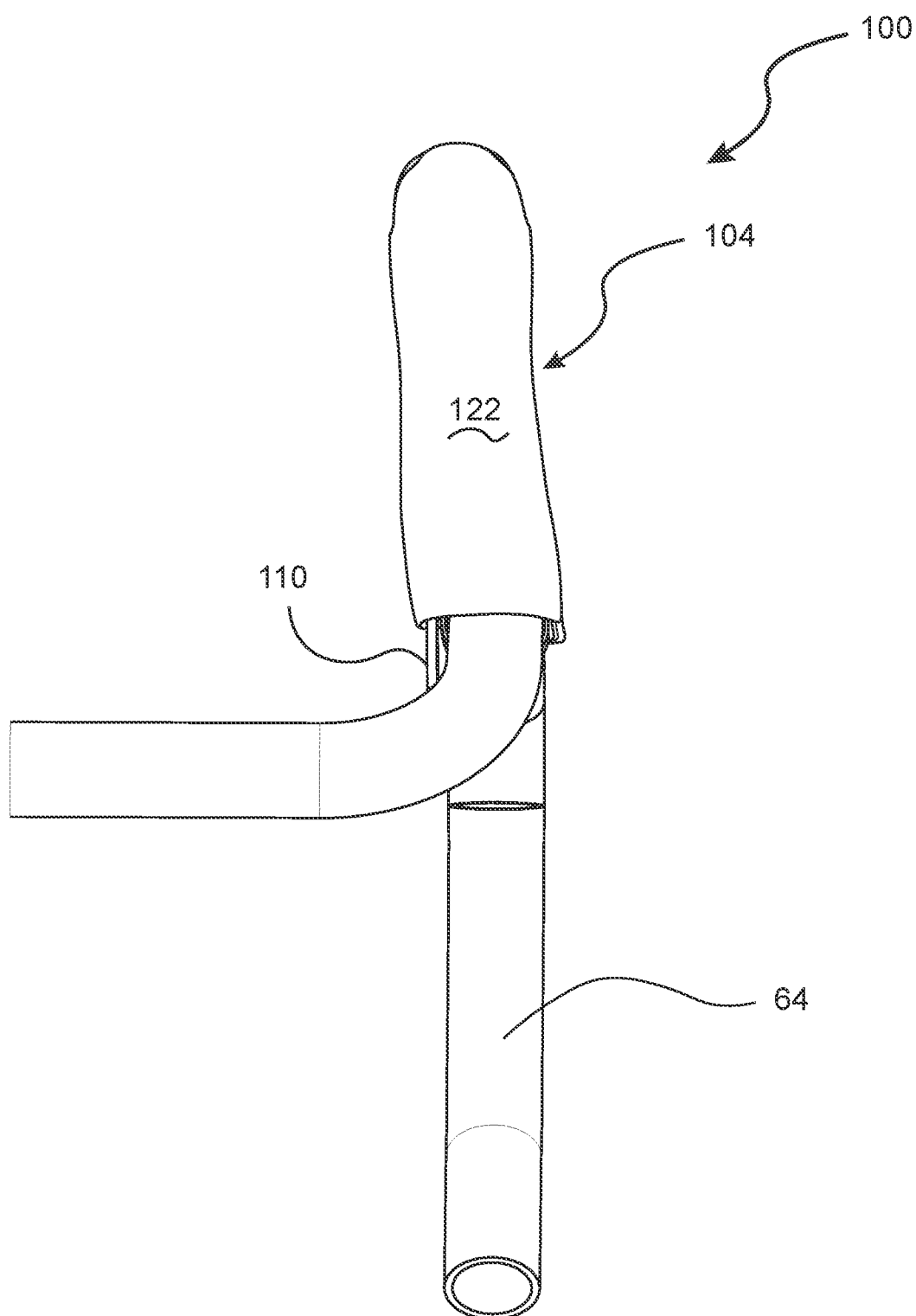
FIG. 5 shows a top view of the bicycle control device of FIG. 2.

In the disclosed example, referring to FIG. 2, the brake lever 102 may have a U-shaped recess or define a channel 128 along at least a lengthwise portion of the grip handle 125. The shift lever assembly 112 may be positioned in a nested arrangement at least partially within the recess or channel 128, as described in more detail below. This nested arrangement of the shift lever assembly 112 with the brake lever 102, and the U-shape of the lever body, can impart some rigidity to the structure and may provide protection for components disposed within the channel. The shift lever assembly 112 may also be pivotally or movably attached to the housing 100, to a pivot mechanism, or to the brake lever 102. The shift lever assembly 112 may be positioned behind the brake lever 102, i.e., between the brake lever and the handlebar 64 when installed on the bicycle 50. The shift lever assembly 112 may also be made of any suitable materials, such as plastic or composite materials. In one example, the shift lever assembly 112 should be made, at least in part, from a material that does not significantly inhibit wirelessly transmitted signals from penetrating the material.

Figure 10:
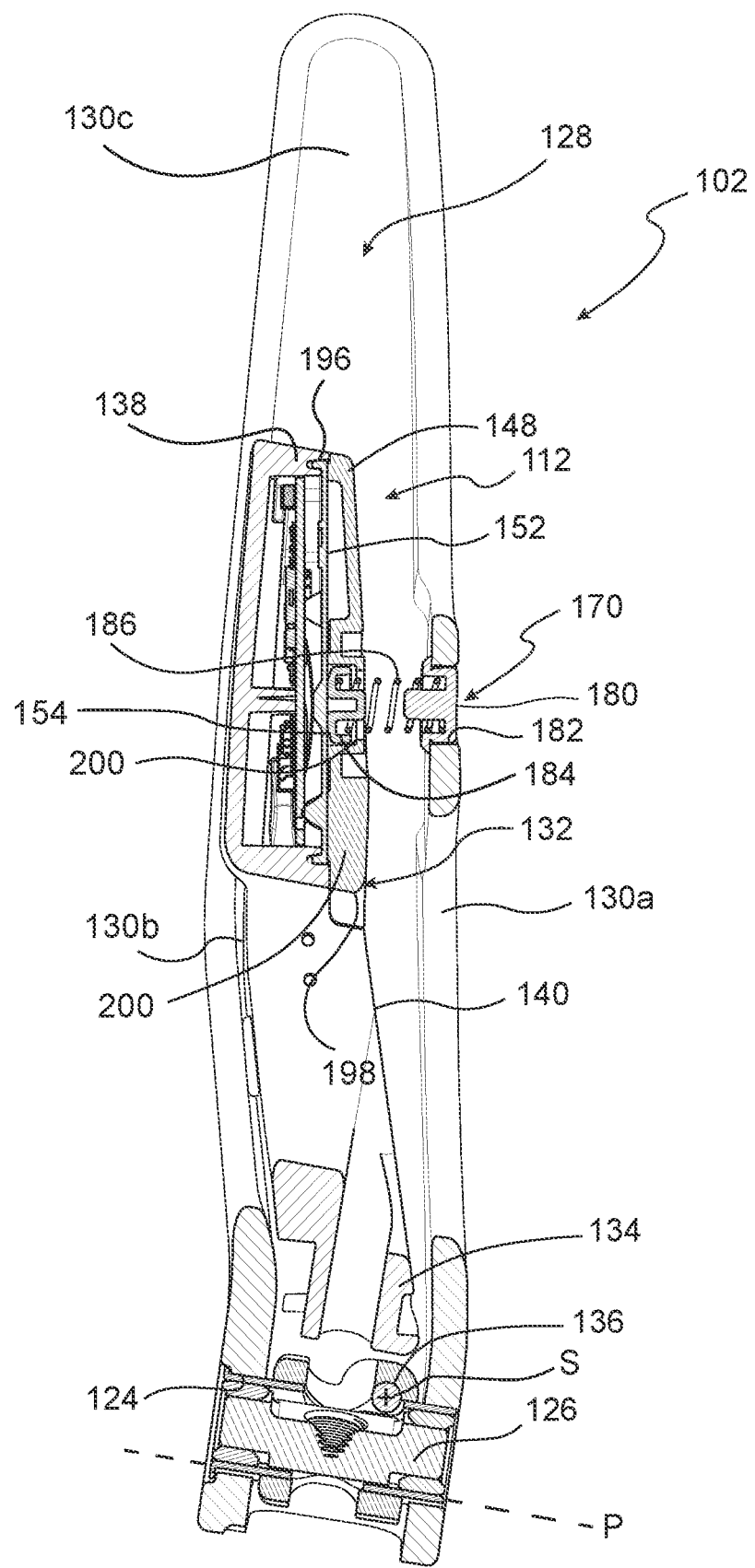
FIG. 10 shows a cross section taken along line 10-10 of the brake lever and shift lever assembly of the bicycle control device of FIG. 9.

FIGS. 9 and 10 depict cross sections of the brake lever 102 and the shift lever assembly 112 in an assembled or in-use arrangement. Referring to FIGS. 2, 9, and 10, the channel 128 of the brake lever 102 is defined between spaced apart side walls including an inside wall 130a and an outside wall 130b, with reference to the orientation of the bicycle 50, and within a front facing wall 130c. The shift lever assembly is nested in the channel 128. As described in further detail below, the shift lever assembly 112 can pivot laterally in a direction between the side walls 130a, 130b about an axis S that is generally perpendicular to the pivot axis P of the brake lever 102 about the axle 126. Thus, the shift lever assembly 112 can move in inboard and outboard directions relative to the bicycle 50 while staying nested and aligned with the brake lever 102.

Figure 11:
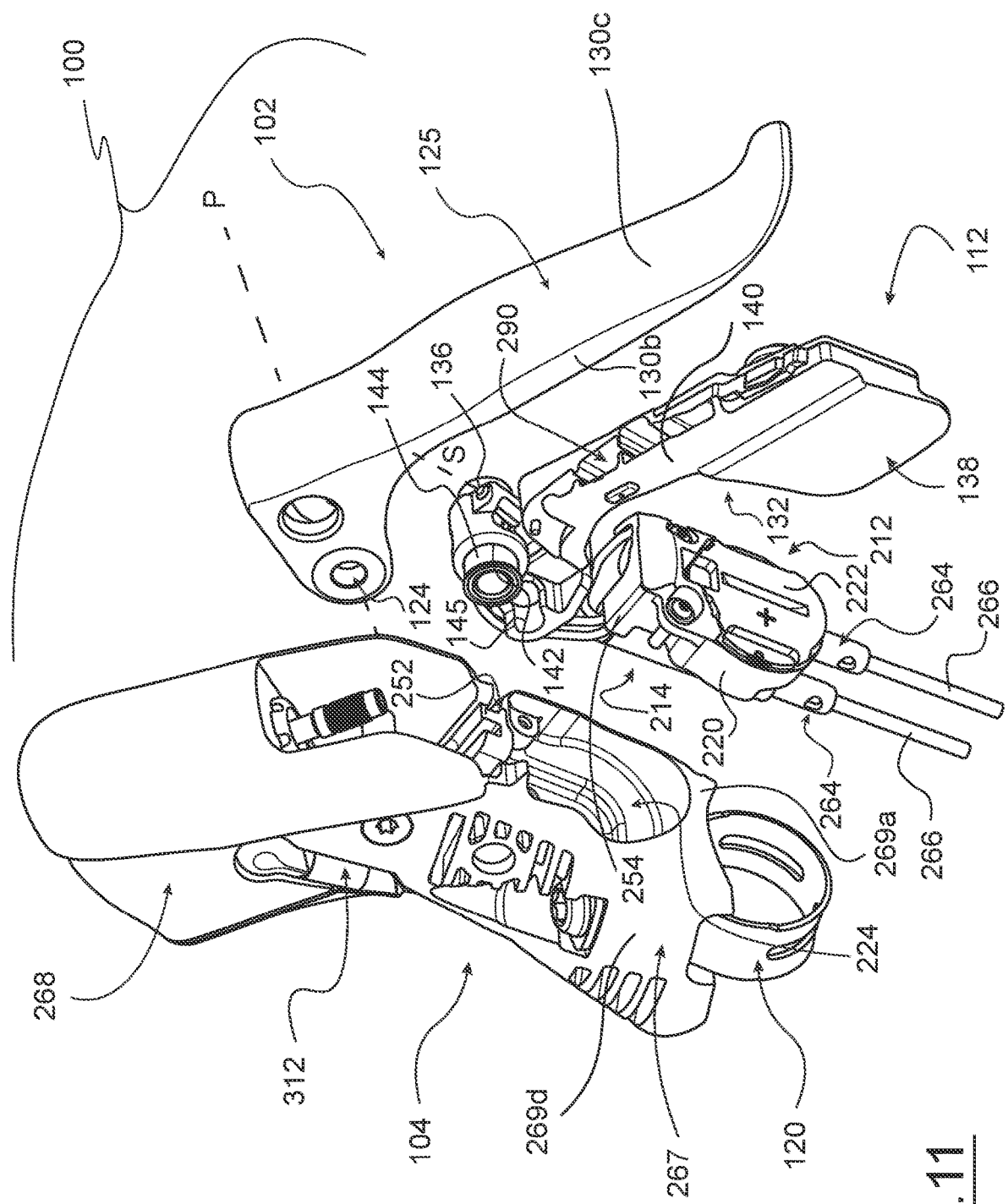
FIG. 11 shows a partial exploded view of the bicycle control device of FIGS. 7 and 8.

In general, referring to FIGS. 9-11, the shift lever assembly 112 has a shift lever 132 including a proximal end 134 that is directly or indirectly pivotally attached to the housing 104 or the brake lever 102 by a pivot pin 136, which defines the pivot axis S of the shift lever assembly. The shift lever 132 also has a distal or paddle end 138 that is opposite the proximal end and an elongate lever arm 140 connecting the proximal and distal ends. The lever arm 140 may be a closed hollow body or may be U-shaped or open sided and can include structural ribbing therein.

In one example, the proximal end 134 of the shift lever 132 may also have a transverse opening 142 that is positioned to accommodate the pivot axle 126 of the brake lever 102 passing through the shift lever assembly 112. The proximal end 134 of the shift lever 132 may also carry connecting components (not described in detail herein) for connecting the brake lever 102 to the hydraulic brake system. Those components can include a sleeve 144 carried by the shift lever 132 and spaced from and parallel to the transverse opening 142. When the shift lever assembly 112 is assembled to the brake lever 102, the sleeve is received in a set of openings 145 at the proximal end of the brake lever 102, which are spaced from the pivot bore 124. The combination of the sleeve 144 and openings 145, along with the transverse opening 142 and the axle 126, marries the brake lever 102 and the shift lever assembly 112 together relative to the brake lever pivot axis P. The shift lever assembly 112 is thus configured to move in concert with the brake lever 102 about the pivot axis P when the brake system is operated, but moves independent of the brake lever when the shift control system is operated. As describe in more detail below, the paddle end 138 of the shift lever 132 includes an interior cavity 146 that houses electronic components of the shift lever assembly 112 and the shift control system.

Figure 12:
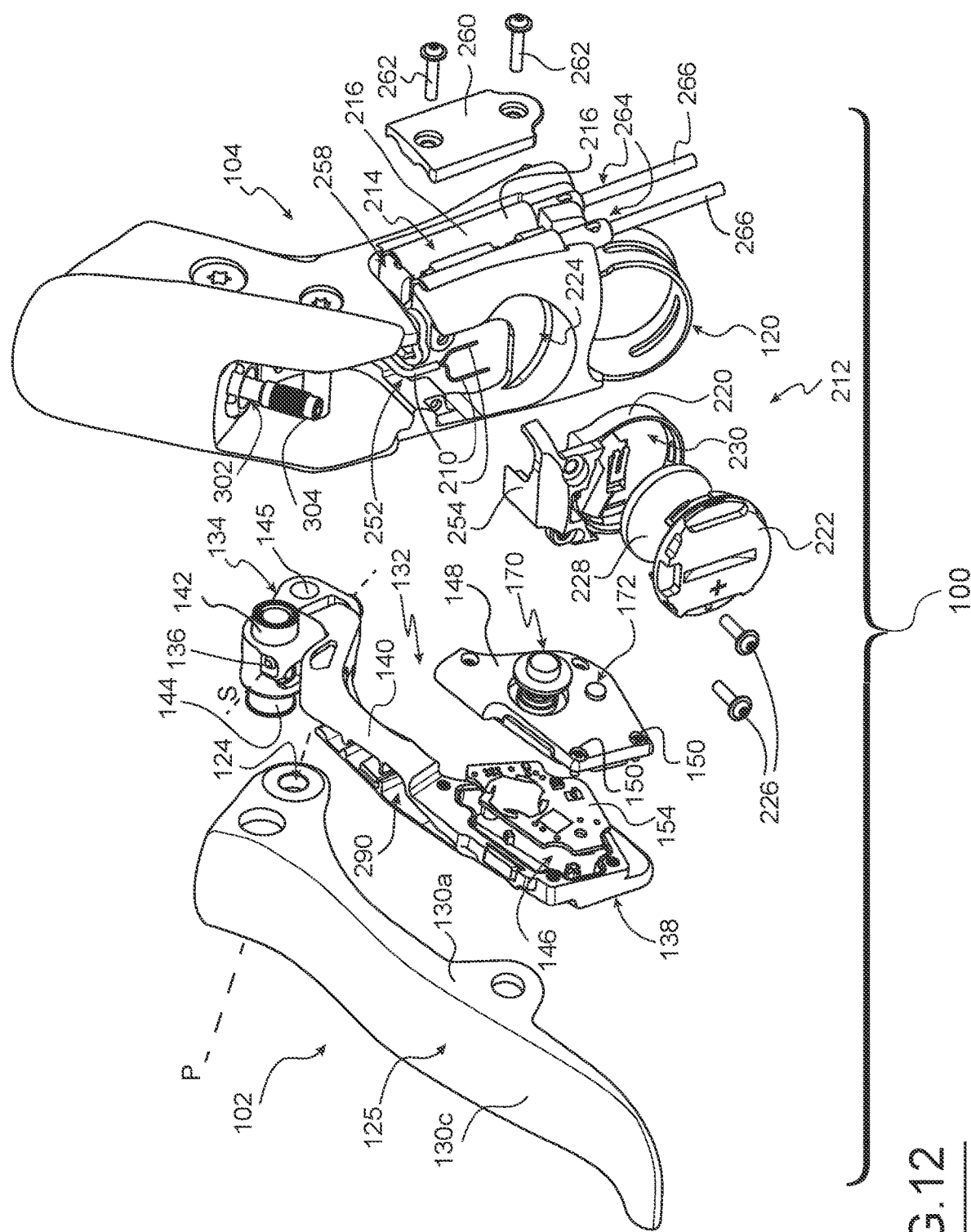
FIG. 12 shows a further exploded view of the bicycle control device of FIGS. 7 and 8.

Referring to FIGS. 11 and 12, the bicycle control device 100 has four primary parts including the housing 104, the outer cover 122 (not shown, see FIG. 6), the brake lever 102, and the shift lever assembly 112. The shift lever assembly 112 and the housing 104 each further include additional sub-components according to the teachings of the present invention and as illustrated generally in FIG. 12.

In the disclosed example, referring to FIGS. 11-14, the shift lever assembly 112 is a self-contained electrical assembly, which provides several advantages and improvements, as described below, over prior known bicycle control devices of this type. In this example, the shift lever assembly 112 includes electronic componentry for operating the bicycle control device 100. Some of the electronic componentry in this example is housed within the interior cavity 146 in the paddle end 138 of the shift lever 132 and some of the componentry is external to but electrically connected with the componentry within the cavity.

The paddle end 138 of the shift lever 132 in this example has a larger surface area than the adjoining lever arm 140. The paddle end 138 thus provides a convenient and ergonomic contact point for a user. The interior cavity 146 includes a cover 148, which can be secured by fasteners 150 to the paddle end 138 to close off the cavity and exclude water and other contaminants from entry into the cavity. A seal 152 may be interposed between the interior cavity 146 and the cover 148. The seal 152 may be a rubber seal membrane or layer or any suitable material that satisfactorily seals the cavity 146 to prevent ingress of moisture or contaminants.

In one example, a printed circuit board (PCB) 154 is disposed within the sealed cavity 146. Various electronic componentry may be mounted on or connected to the PCB 154. The PCB 154 may include a communication module 156 configured to transmit signals from the control device 100. In one example, the communication module 156 may be configured for wireless transmission of signals in the form of electromagnetic radiation (EMR), such as radio waves or radio frequency signals. Optionally, the communication module 156 may also be configured to receive signals. In one example, the communication module 156 may be configured to receive signals, which may be in the form of EMR such as radio waves or radio frequency signals. The communications module 156 can include or can be a transmitter or a transceiver. The PCB 154 may also include an antenna 158 that is in operative communication with the communication module 156 to send and optionally also receive EMR signals. The antenna 158 may be any device designed to transmit and/or receive electromagnetic radiation (e.g. TV or radio) waves.

In the disclosed example, the antenna 158 is on the PCB 154 in a position where it will be able to send signals without significant interference from the structure of the bicycle control device 100 and/or from a user's hand. In another example, to help reduce or prevent interference, the antenna 158 may be a wireless antenna and may be positioned, at least in part, in or on a portion of the bicycle control device 100 that is separate and remote or spaced from the housing 104. The antenna 158 may be positioned on another part of the brake lever 102 or the shift lever 132, for example.

The bicycle control device 100 also includes a controller 160, which in this example is also on the PCB 154. The controller 160 is operatively connected to the communication module 156 to perform electronic operations such as generating the signals related to one or more of shifting, pairing, derailleur trim operations, power management, and the like. The controller 160 may be programmable and configurable to generate signals to control the front and rear derailleurs 74, 76, for example. In one example, the controller 160 may be an Atmel ATmega324PA microcontroller with an internal EEPROM memory. The communication module 156 may also be programmable and configurable to likewise to transmit and/or receive signals to control the front and rear derailleurs 74, 76. In one example, the communication module 156 may be an Atmel AT86RF231 2.4 GHz transceiver utilizing AES encryption and DSS spread spectrum technology supporting 16 channels and the IEEE 802.15.4 communication protocol. However, other suitable microcontrollers 160 and communications modules 156 may be utilized. Additionally, ancillary electrical and/or electronic devices and components may be used, as is well known in the art, to further enhance or enable the function and operation of the controller 160 and the communications module 156 and related components.

In one example, the bicycle control device 100 may include at least one light emitting diode (LED) 162, which may also be positioned on the PCB 154. The LED 162 may convey status information to a user or a rider relating to the electronic componentry and function of the shift lever assembly 112 or bicycle control device 100. The LED 162 in this example is visible through a transparent part 164 of the seal 152 and a window or opening 166 in the cover 148 of the cavity 146. In one example, the entire seal 152 may be transparent. Alternatively, only the part 164 of the seal material is configured to permits light through the seal.

Further, the electronic componentry may include one or more electrical switches 170, 172. The electrical switches 170, 172, when actuated, may cause operations to be carried out by the controller 160. Such operations may relate to signal transmission or reception, derailleur, and control device 100 pairing, trim and/or shift operations, and the like. The switches 170, 172 may generate signals to initiate or elicit an action and/or response from various mechanisms of the bicycle 50, such as the front and rear electromechanical derailleurs 74, 76.

In this example, the first electrical switch 170 includes a contact (not shown) on the PCB 154 underlying a resilient dome switch element 174, also on the PCB. In this example, the first electrical switch 170 is actuated through the seal 152 from outside the cavity 146 and the shift lever 132. The cover 148 has a first switch opening 176, where both the cover and the opening are on the inward facing side of the shift lever 132, i.e., the non-actuation side of the paddle end 138. An actuator 178 is seated in the first switch opening 176, as depicted in FIGS. 6, 10, and 12. The actuator 178 includes a button 180 that is received in a hole 182 in the inside wall 130a of the brake lever 102. A spring retainer 184 is retained in the first switch opening 176 in the cover 148. A spring 186 extends between the button 180 and the retainer 184 and biases the shift lever toward the outside wall 130b of the brake lever 102, as depicted in FIG. 10. A user or rider operates the shift lever 132 by pushing inward on the actuation surface, i.e., outside surface of the paddle end 138 against the bias force of the spring 186. As the rider pushes on the paddle end 138, the button 180 will eventually contact the spring retainer 184. Through the seal 152, the spring retainer 184 will push against the domed switch element 174, which will further touch the contact on the PCB 154 to close and actuate the first electrical switch 170.

The second electrical switch 172 includes a contact 190 on the PCB 154. The contact 190 may be a domed switch element or a pressure type switch contact. In this example, the second electrical switch 172 is also actuated through the seal 152 from outside the cavity 146 and the shift lever 132. The cover 148 has a second switch opening 192, where both the cover and the opening are again on the inward facing side of the shift lever 132, i.e., the non-actuation side of the paddle end 138. A button 194 extends through and is seated in the second switch opening 192 in the cover 148, as depicted in FIG. 6. The button 194 may be integrally formed as a part of the seal 152 or may be attached to the seal material. A user or rider operates the second electrical switch 172 simply by depressing the button 194 toward the cover 148. The button 194 or the underlying material layer of the seal 152, may have a point contact (not shown) on the inside end, which pushes against the seal 152 to depress and close the contact 190 to actuate the second electrical switch 172.

The buttons 180 and 194 operate through the material layer of the seal 152, whereby the integrity of the seal for the cavity 146 is not compromised. Other types of electrical switches may be used. The first electrical switch 170 may be used for operating the bicycle control device 100 on a frequent and more forceful basis, such as to initiation of a gear shift or gear change. The second electrical switch 172 may be an optional switch and in this example, may be smaller and more self-contained. The second electrical switch 172 may be intended to be used less frequently than the first electrical switch 170. In one example, the second electrical switch 172 may be used for operations related to pairing the bicycle control device with a specific bicycle component, such as the front or rear electromechanical derailleurs 74, 76, or for trimming the derailleurs.

Figure 14:
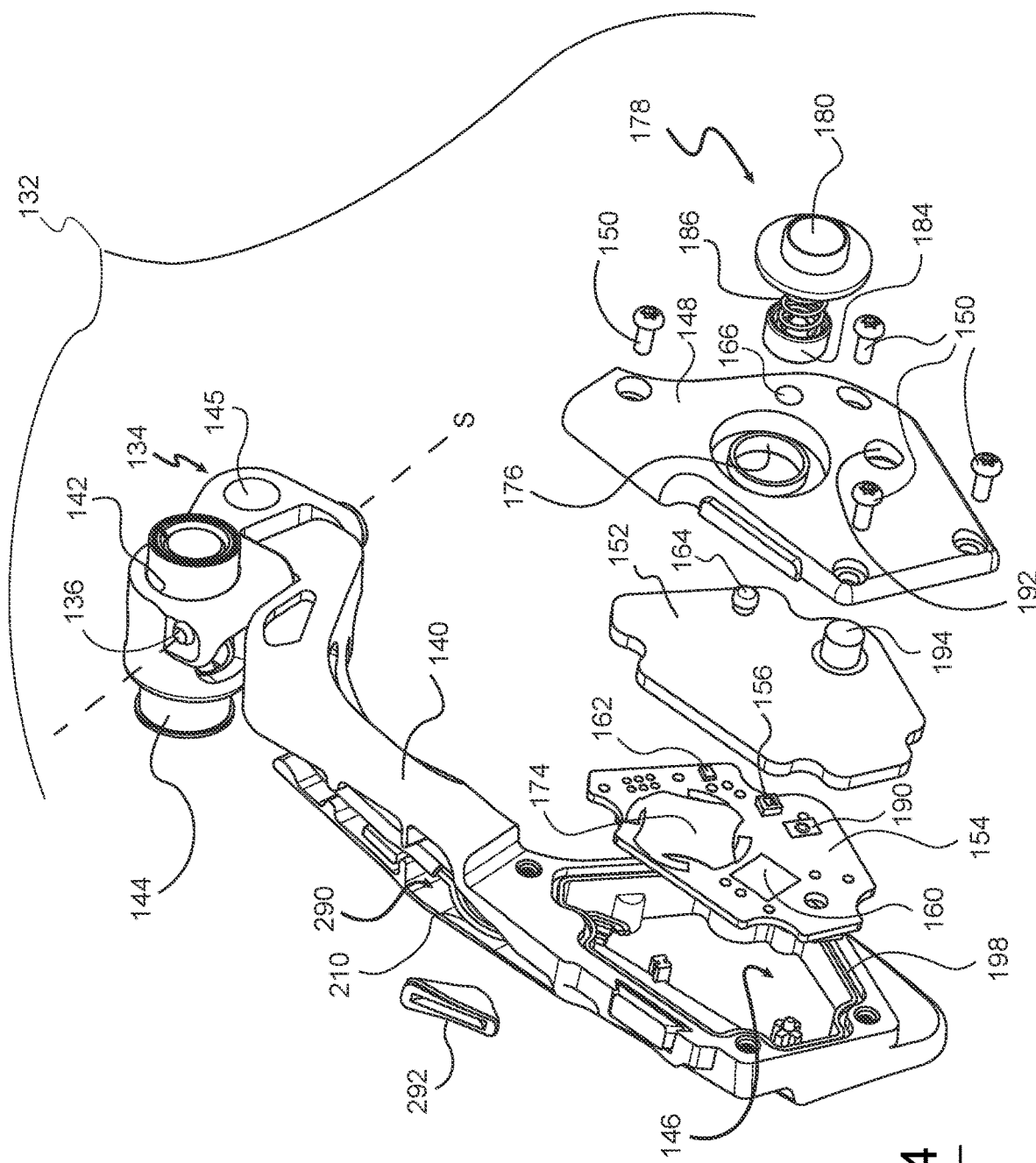
FIG. 14 shows an exploded perspective view of a portion of the shift lever assembly of FIG. 13.

The electronic componentry on the PCB 154 and within the cavity 146 is retained and sealed in place in the cavity. The seal 152 overlies the PCB 154 and is sandwiched between the paddle end 138 and he cover 148 of the shift lever 132 when the cover is fastened to the shift lever. Referring to FIGS. 10 and 14, the seal 152 may include a perimeter rib 196 around the seal material. Likewise, the paddle end 138 may include a groove 198 around the opening into the cavity 146. The rib 196 can seat in the groove 198 to create a tight environmental seal when the cover 148 is secured to the paddle end 138. The material layer of the seal 152 may include raised or thickened regions 200, which may be positioned to coincide with the electrical switches 170, 172, to encourage effective force transfer from the buttons 180, 194 to the switches. The actuation of the electrical switches 170, 172 sends signals through associated circuitry, as is well known, to be acted upon by the controller 160.

Figure 13:
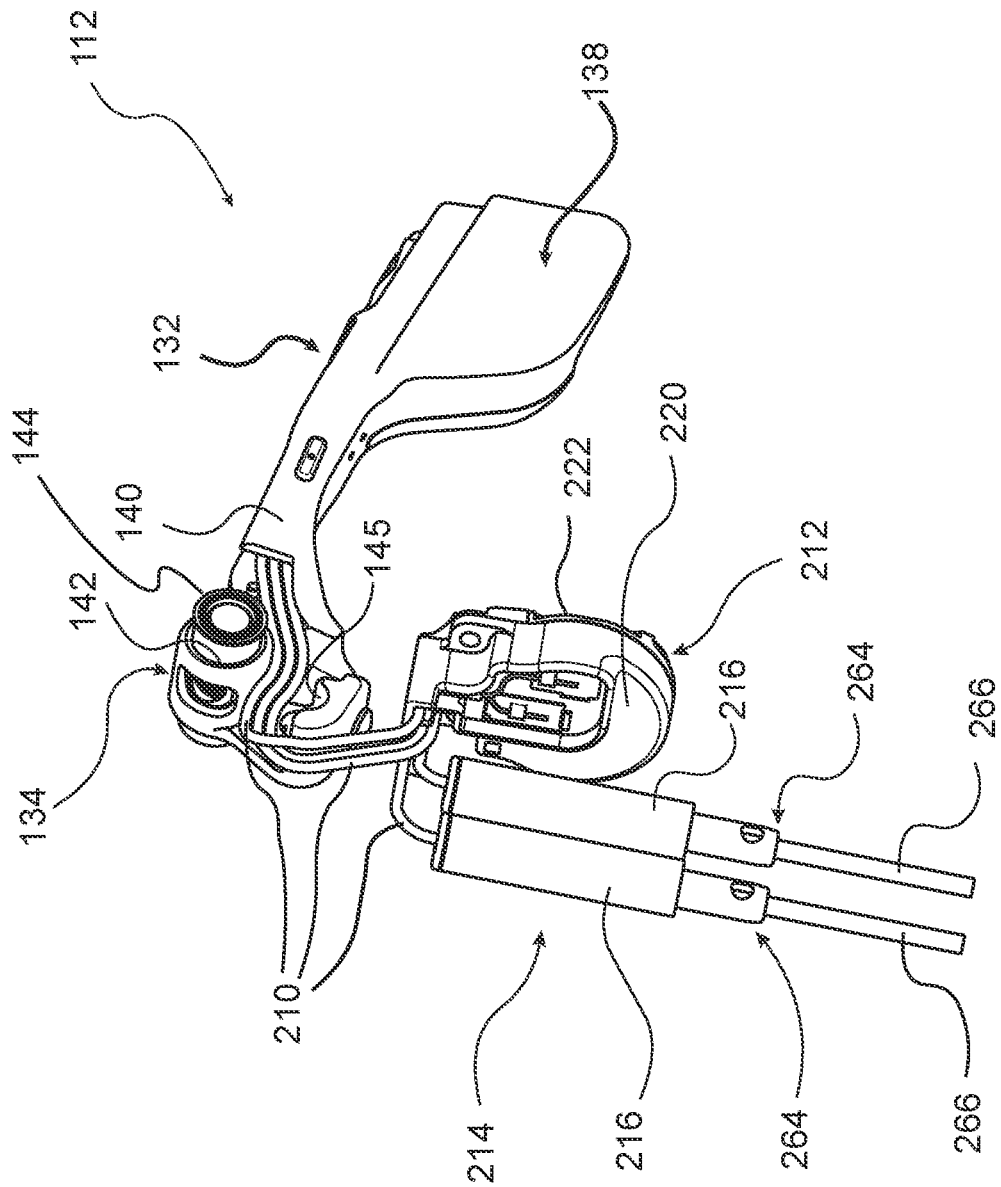
FIG. 13 shows a rear perspective view of the shift lever assembly of the bicycle control device of FIG. 11.

Referring to FIGS. 13 and 14, one or more wires or electrical cables 210 are electrically connected to the electronic componentry of the PCB 154 and are routed from the cavity 146 through an opening into the lever arm 140. The wires 210 extend along the interior of the lever arm 140 and are routed around and between the sleeve 144 and the transverse opening 142 on the proximal end 134 of the shift lever 132. In the disclosed example, the wires are connected to a power supply, i.e., a self-contained battery unit 212. In this example, the shift lever assembly 112 also includes an accessory jack body 214 defining two accessory jacks 216, which are also electrically connected by the wires 210 to the battery unit 212 and to the electronic componentry of the PCB 154. In one example, the jack body 214 can be a single body defining two female accessory jacks 216 therein. Alternatively, each of the accessory jacks 216 can include its own separate body 214 element. The wires 210 thus electrically connect the power supply or battery unit 212 to the accessory jacks 216 and to the electronic componentry of the shift lever assembly 112.

The accessory jacks 216 may be connected to the PCB 154 and/or to a separate accessory PCB (not shown) within the accessory jack body 214. The accessory jack body 214, if provided, can define one or more than two accessory jacks 216, if desired. Connectors for optional remote actuators, buttons, or switches may be connected to the bicycle control device 100 through the accessory jacks 216. The accessory jacks 216 can then provide power and electrical connection and operation between the remote actuator(s) and the battery unit 212 and the PCB 154. The accessory jacks 216 may be configured to accept connectors from optional additional and/or remote electrical switches or other devices (not shown), such as optionally placed remote shift control buttons on the bicycle 50, to the control device 100. When no accessories are connected to the control device 100, the accessory jacks 216 may be closed and/or sealed from moisture and contamination by inserting plugs 218 into the jacks.

The shift lever assembly 112 in this example is thus a self-contained electrical component of the control device 100. The shift lever 132 and electrical componentry are capable of wirelessly transmitting shift control signals to the front and rear derailleurs 74, 76 according to actuation of the shift lever 132. The battery unit 212 and each accessory jack 216 may be connected by separate wires 210 using a multiple pin connector at the PCB 154. The battery unit 212 and jacks 216 can either have separate connection points to the PCB 154 or can use a cable assembly that starts with a single wire near the PCB and then splits to two or more wires. The battery unit 212 and jack body 214 are each connected to the housing 104 in a unique manner according to the present disclosure.

Figure 15:
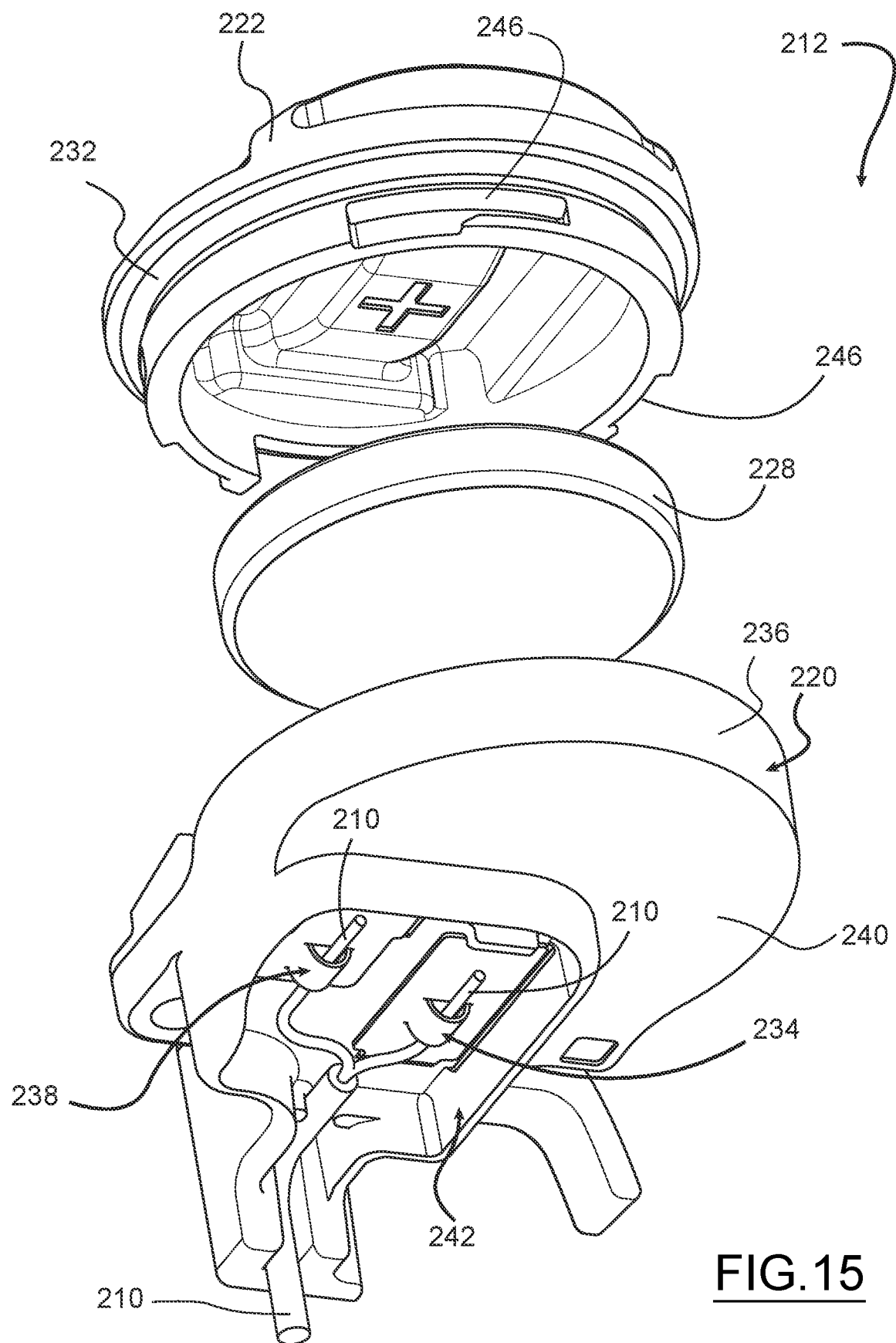
FIG. 15 shows an exploded bottom perspective view of a battery unit of the shift lever assembly of FIGS. 11-13.
Figure 16:
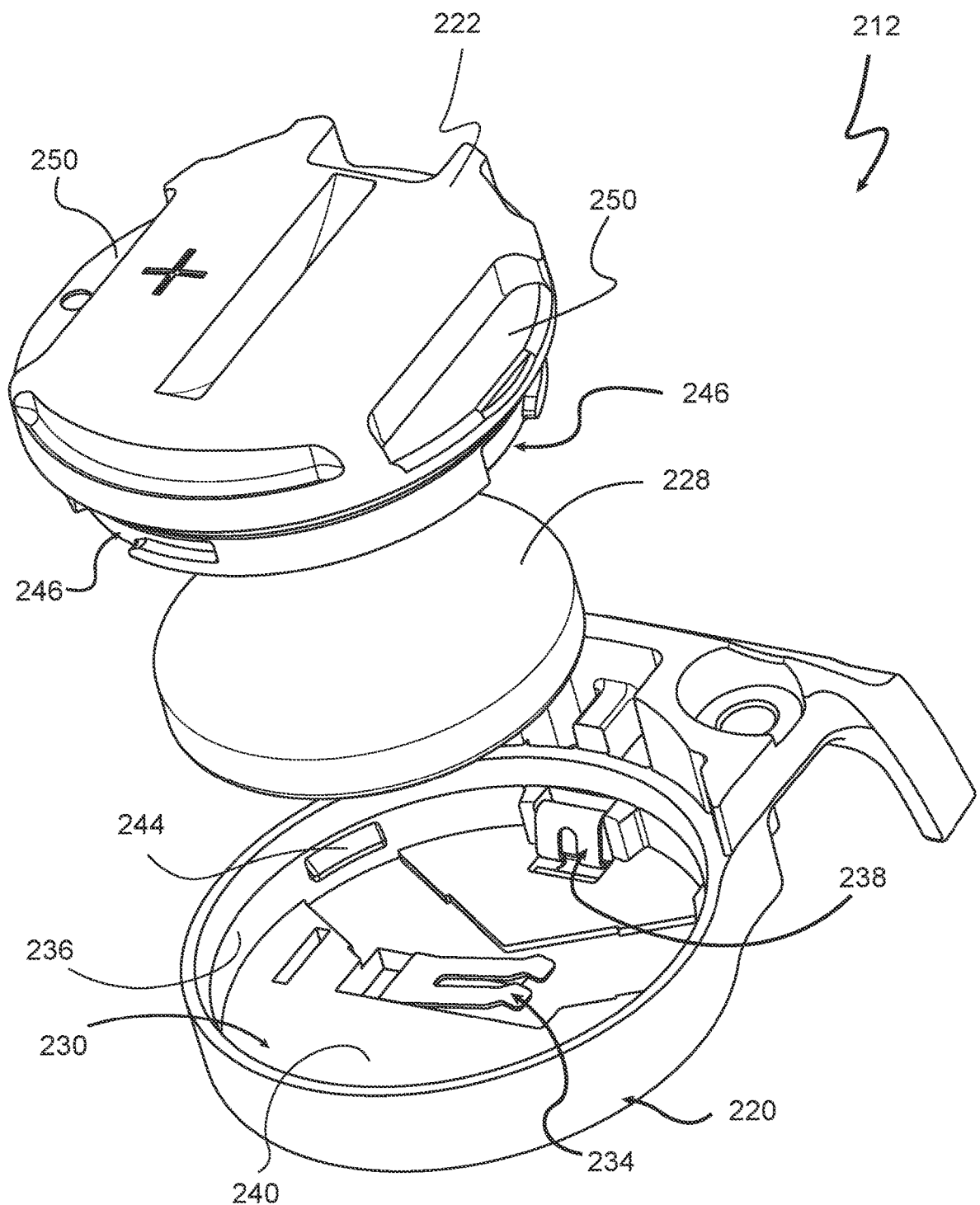
FIG. 16 shows a top perspective view of the battery unit of FIG. 15.

In this example, referring to FIGS. 12, 15, and 16, the battery unit 212 includes a battery case 220 and a battery cover 222. The battery case 220 is received in a recess 224 in the housing 104 and is fixedly attached to the housing via fasteners. In this example, the battery case 220 is fastened to the housing via screws 226, but could similarly be attached to the housing via snap features, adhesive, or another suitable means. A conventional and replaceable coin cell type battery 228 may be received within a battery receptacle 230 defined by the case 220 and open to the exterior of the housing 104. Alternatively, the battery can be a non-replaceable and/or rechargeable battery. The battery 228 may be configured to provide power for the control module 156, the controller 160, and to remote switches or electrical devices via the accessory jacks 216. The cover 222 is rotatable to install over the receptacle 230 and the battery 228 and can be reverse rotated to be removed to access the battery. The cover 222 can include an elastomeric O-ring or gasket 232 around its periphery to create a moisture and contaminant proof seal against the case 220 or the housing 104 when installed.

Referring to FIG. 16, the battery receptacle 230 includes a positive contact 324 at a periphery wall 236 of the receptacle and includes a negative contact 238 at the center of the receptacle on a bottom wall 240. Exposed contact portions of the electrical or positive and negative contacts 234, 238 within the battery receptacle 230 contact the corresponding two terminals of the battery 228. Referring to FIG. 15, the battery case 220 also includes a second cavity 242 on a side opposite the battery receptacle 230 and which faces into the housing recess 224 when the case is installed. Portions of the electrical contacts 234 and 238 extend through holes within the case between the battery receptacle 230 and the second cavity 242. Exposed connector portions of the electrical contacts 234, 238 are connected to separate wires 210 within the second cavity 242. These connector portions can be soldered to join the wires 210 and the contacts 234, 238 and the wires can then be connected to the PCB 154. Alternatively, the wires 210 can be crimped or otherwise mechanically secured to the exposed portions of the contacts 234, 238. The positive and negative contacts 234, 238 can be secured to the case via slot features in the wall 236 and bottom 240 of the battery receptacle 230. Alternatively, the contacts could similarly be attached to the case via staking, mechanical fasteners, adhesive, or another suitable means.

During assembly, the second cavity 242, which faces into the recess 224 of the housing 104, is filled with an epoxy that acts to both secure the contacts 234, 238 and wires 210 in place and to create a seal that prevents water and other contaminants from reaching the contacts, the battery 228, the battery receptacle 230, and the interior of the wires 210. This epoxy seal could similarly be provided via a cover piece that is attached to the second cavity 242 via plastic welding, fasteners, adhesive, or another suitable means.

The battery cover 222 may be secured via conventional mechanical threads to the case 220. However, in this example, the cover 222 is secured to the case 220 via a set of tabs 244 or keys and slots 246 or ways that engage one another when the cover is twisted into place. The O-ring 232 is compressed between the cover 222 and the case 220 or a surface of the housing 104 to provides a second seal for the battery receptacle 230 against water and other contamination. The battery cover 222 and/or the case 220 may also contain a series of recesses or depressions 250 on the exposed outer surfaces. The outer cover 122 may include protruding boss features (not shown) on the interior side of the cover that are received in these recesses or depressions 250. When the outer cover 122 boss features are engaged with the recesses or depressions 250, unintentional movement of the battery cover 222 may be inhibited or prevented.

Figure 17:
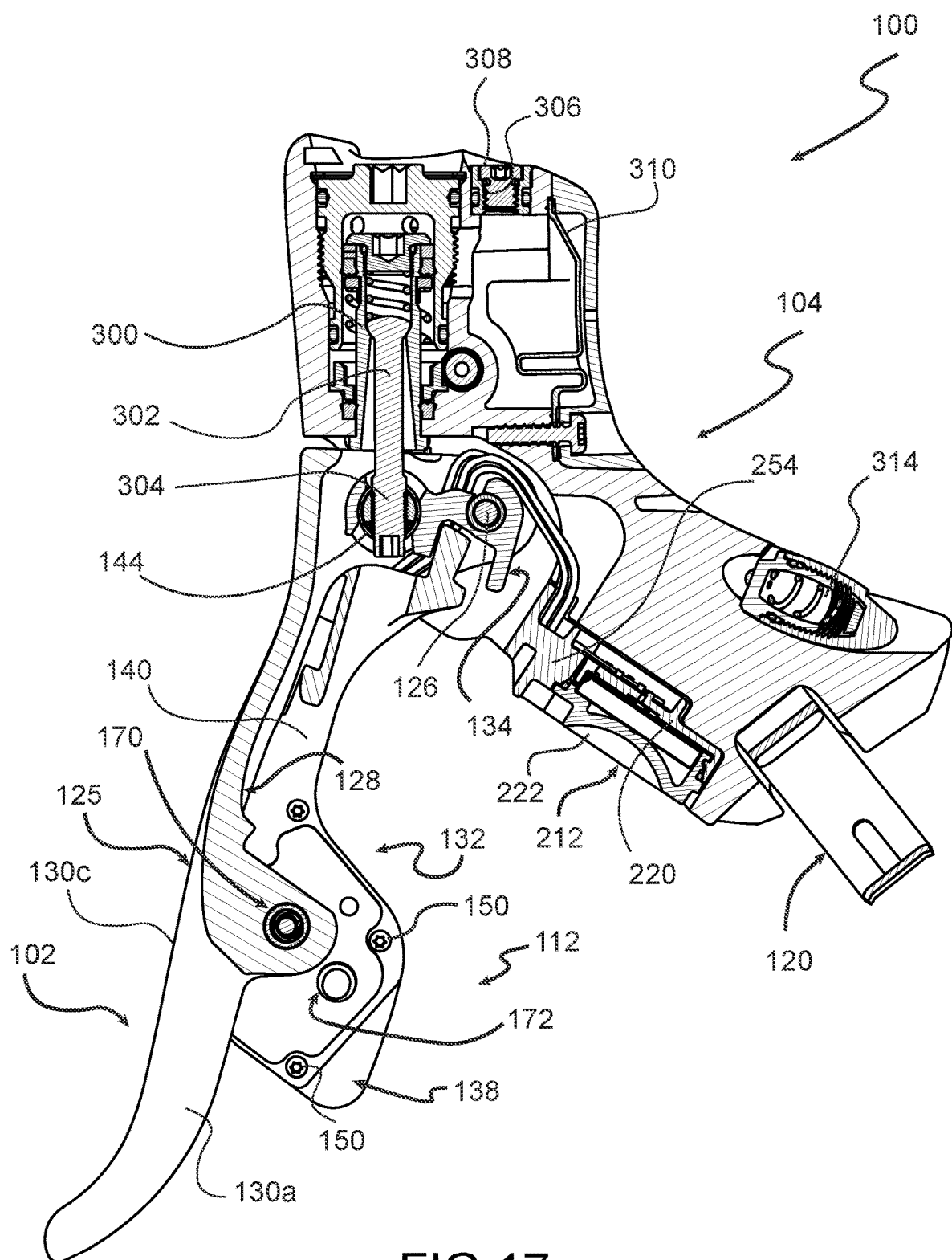
FIG. 17 shows a cross section taken along line 17-17 of the bicycle control device of FIG. 3.

FIG. 17 shows a cross section of the assembled control device 100. In this example, the battery unit 212 is installed in the recess 224 in the housing 104. The wires 210 between the battery unit 212 and the shift lever 132 are routed via a first channel 252 in the housing 104 above the recess 224. The battery case 220 includes an upper block portion 254 that seats in the first channel 252 to help cover the channel in the assembled control device 100. The block portion 254 also helps to align the case 220 during installation on the housing 104.

In the disclosed example, the housing 104 may be described as having several sides including an inward facing side, an outward facing side, a bottom side, and a top side. In this example, the battery unit 212 is installed on the bottom side of the housing, as depicted in FIGS. 7, 8, and 17. According to the present disclosure, though the shift lever assembly 112 includes the shift lever 132 and electronic componentry, the accessory jack body 214, and the battery unit 212 as a self-contained assembly, the accessory jack body can be installed on a different side of the housing 104. FIGS. 7 and 18-20 show that the accessory jack body 214 is installed in a jack recess 256 on the inward facing side of the housing 104. A second channel 258 in the housing 104 is disposed above the jack recess 256 for routing the wires 210 from the jack body 214 to the battery unit 212 and PCB 254.

Figure 18:
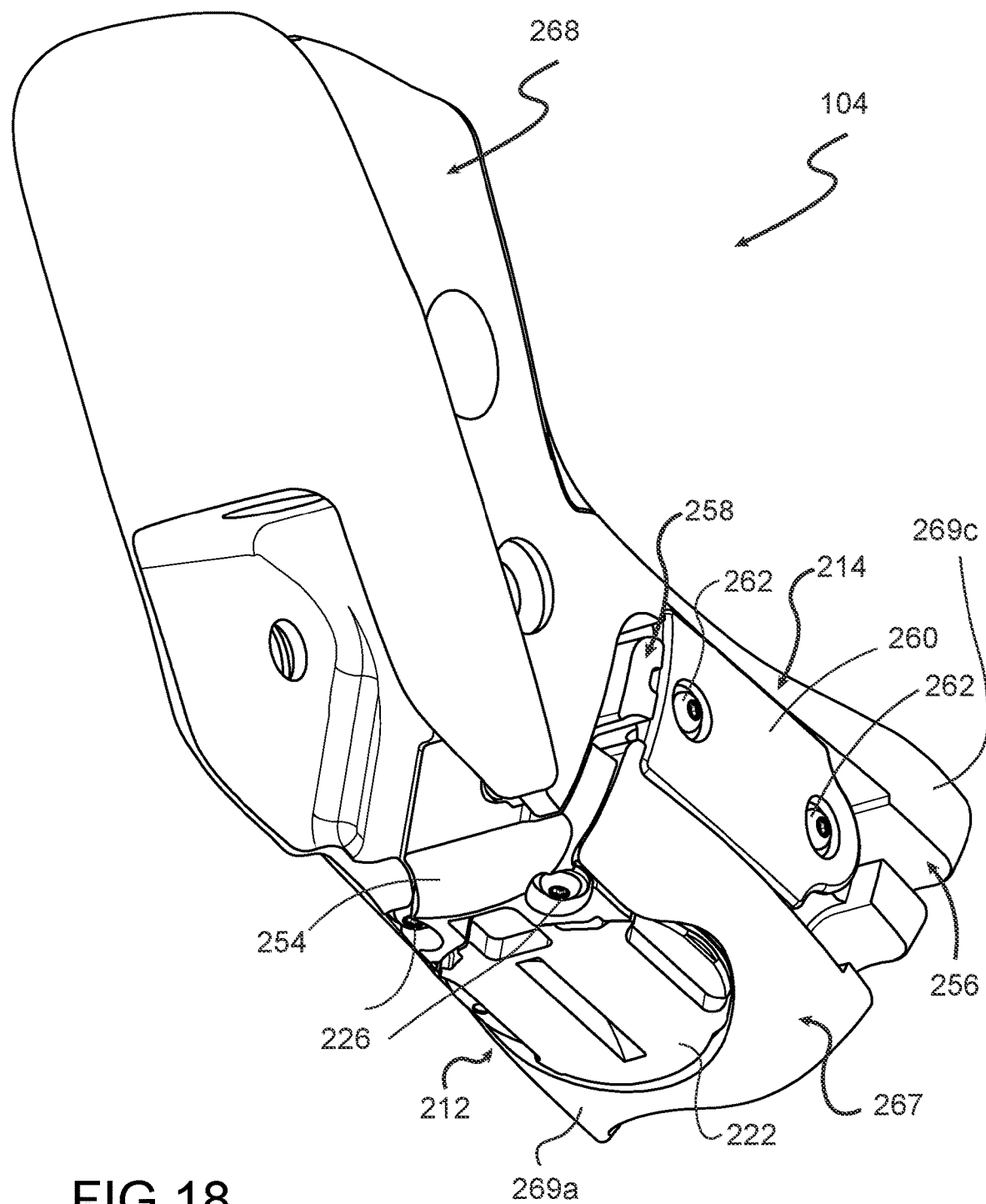
FIG. 18 shows a bottom perspective view of a housing portion of the bicycle control device of FIG. 7.
Figure 19:
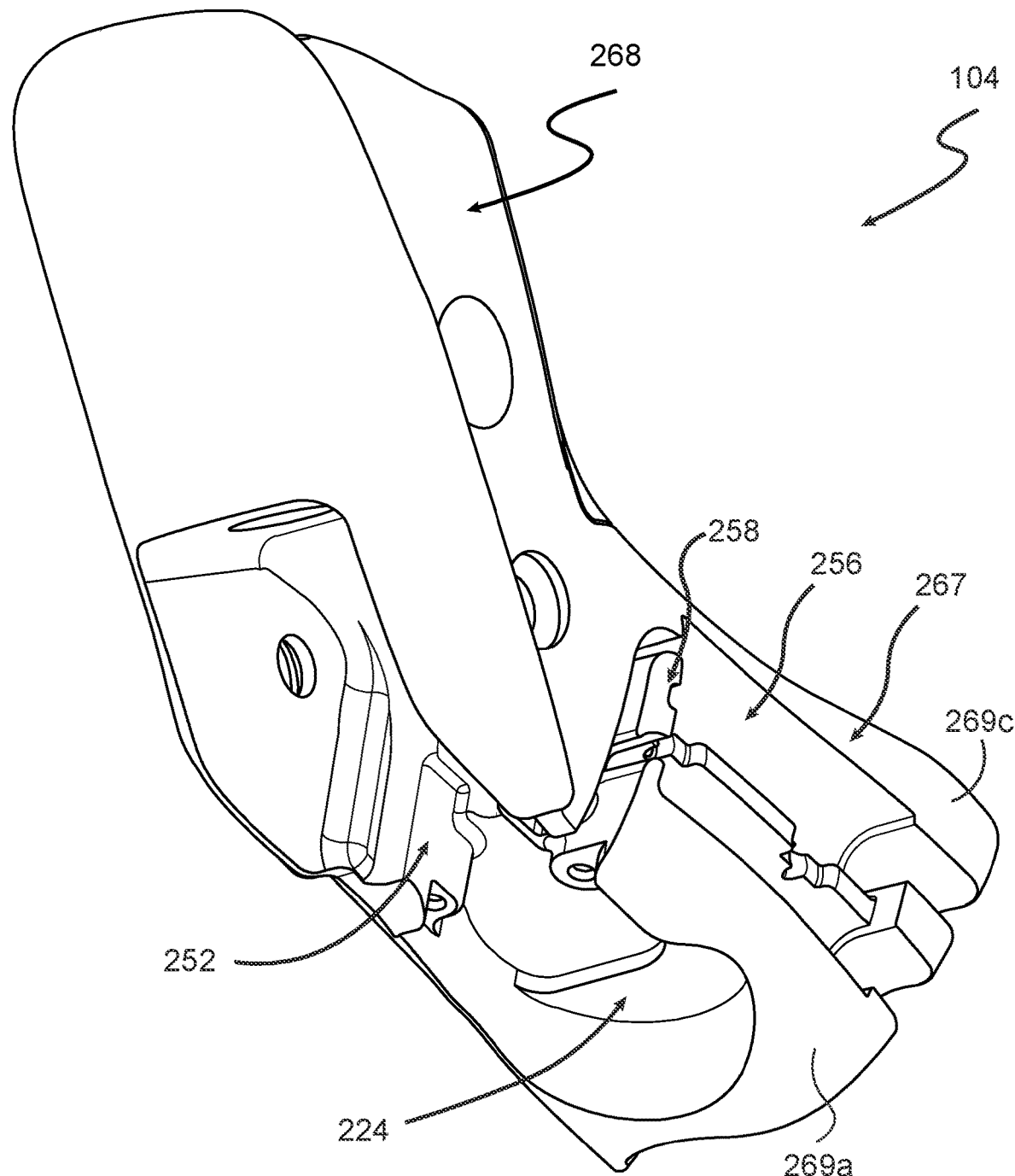
FIG. 19 shows the housing portion of FIG. 18, but with the battery unit removed.
Figure 20:
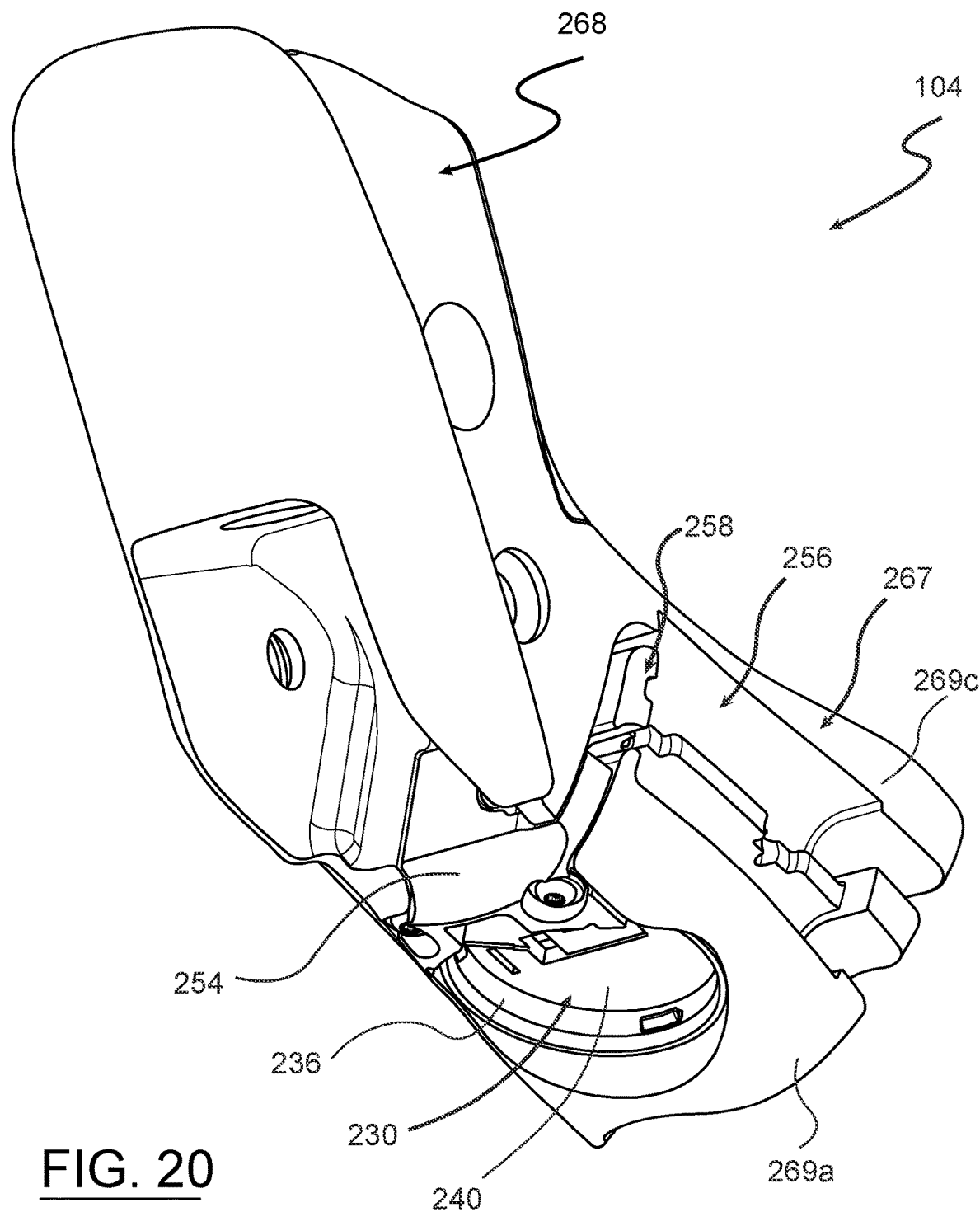
FIG. 20 shows the housing portion of FIG. 19, but with a battery receptacle of the battery unit installed in the housing.

Referring to FIGS. 7, 12, and 18, a jack cover 260 is removably attached to the housing 103 to cover the jack recess 256 to secure and retain the jack body 216 within the jack recess. The jack recess 256 can be shaped to compliment the shape of the jack body 216 or the separate jack bodies of the accessory jacks 216. The accessory jacks 216 in this example are female jacks with access openings (not shown) located on and accessible from the external surface of the housing 104. The accessory jacks 216 provide an interface between optional remote shift control button assemblies and the shift control system including the shift lever assembly 112. In one example, two or more accessory jacks could be combined into a single assembly with a single cable assembly emanating to the battery unit 212 and PCB 154. In this example, the jack body 214 is fixedly attached to the housing 104 via the jack cover 260 that is fastened to the housing with screws 262. The jack body 214 could instead be attached to the housing via snap features, adhesive, or other suitable means. The jack body 214 could also be non-permanently fixed to the housing such that the jack body or accessory jacks 216 can be lifted out of the housing when not covered by the jack cover 260.

Though not shown herein, the jack body 214 for each accessory jack 216 can have two cavities including an interior cavity located closer to the shift control system and separated from an external cavity, which defines a plug interface or connector receiver for receiving a connector for an accessory component. Each plug interface can function, when in use, to retain a remote shift control button connector therein and to electrically connect the connector terminal to one end of a wire or cable assembly that terminates at the PCB 154 at the other end. The terminal or terminals can extend from the external cavity to the internal cavity for each accessory jack 216 and be connected to the wire or wires. The internal cavity is filled with an epoxy, similar to the battery case second cavity 242. The epoxy can secure the wires in place and create a seal that prevents water and other contaminants from reaching the internal cavity, the cable, or wires therein, the plug interface, and the external cavity. Such a seal could instead be provided by molding the jack body or a separate interface piece over the exterior of the wire connections and jack body.

Referring to FIGS. 7, 11, 12, 13, and 21 when not being used, the accessory jacks 216, and particularly the exterior cavities, can be closed or plugged by inserting a plug 264 into each of the access openings. The plugs 264 are inserted into the jack body's external cavities. A seal can be created via an elastomeric O-ring (not shown) that is compressed between the exterior of the plug 264 and the inner wall of the externa cavities. The plug seal prevents water and contaminants from reaching the electrical interface and parts within the jack body 214. The connectors for remote accessories can look and function similar to the plugs 264, except that each connector would make electrical contact with a terminal or terminals within the external cavities. The plugs 264 can include an extension or tail 266 that protrudes from the accessory jacks 216 so that the plugs can be easily grasped and pulled from the jack body 214 when needed.

Referring to FIGS. 17-21, the housing 104 can be formed having a base portion 267 and an extension portion 268. The base portion 267 can include first and second or rear facing and front facing ends, a downward facing side 269a, an upward facing side 269b, an inward facing side 269c, an outward facing side 269d. The handlebar clamp 120 in this example is disposed at the first or rear facing end. When the control device 100 is mounted to a bicycle handlebar 64, the base portion 267 extends generally horizontally and the extension portion 268 extends forwardly of the base portion at the second end and is angled generally upwardly from the base portion.

The inward facing side 269c and an outward facing side 269d, the inward facing side being closer to the center of the bicycle frame 52 when the housing 104 is mounted on the handlebar 64. In this example, the remote shift control accessory jacks 216 are located on the inward facing side 269c of the base portion 267 of the housing 104. However, the jacks could instead be positioned on the outward facing side 269d, or on both sides. Further, in this example, the battery recess 224 in the housing, and thus the battery case 220, are disposed on the downward facing side 269a on the base portion 267. One or more electrical wires 210 extend from the top of the jack body 214 and between the accessory jacks 216 and the PCB 154. The wires 210 are compressed into and routed via the second channel 258 in the housing 104 above the jack recess 256 toward the wires of the battery unit 212. The wires 210 are then routed toward the PCB 154 along with the wires for the battery unit 212. The jack cover 260 can also have a gasket or seal that creates tight seal between the cover and the housing 104 when installed. The battery case 220, when secured to the housing 104, also has features that secure the wires 210 by compressing the wires between the battery case and the housing. The battery case 212 also has a guide feature, i.e., the block portion 254 that guides the wires from the exterior to the interior of the housing 104.

Figure 22:
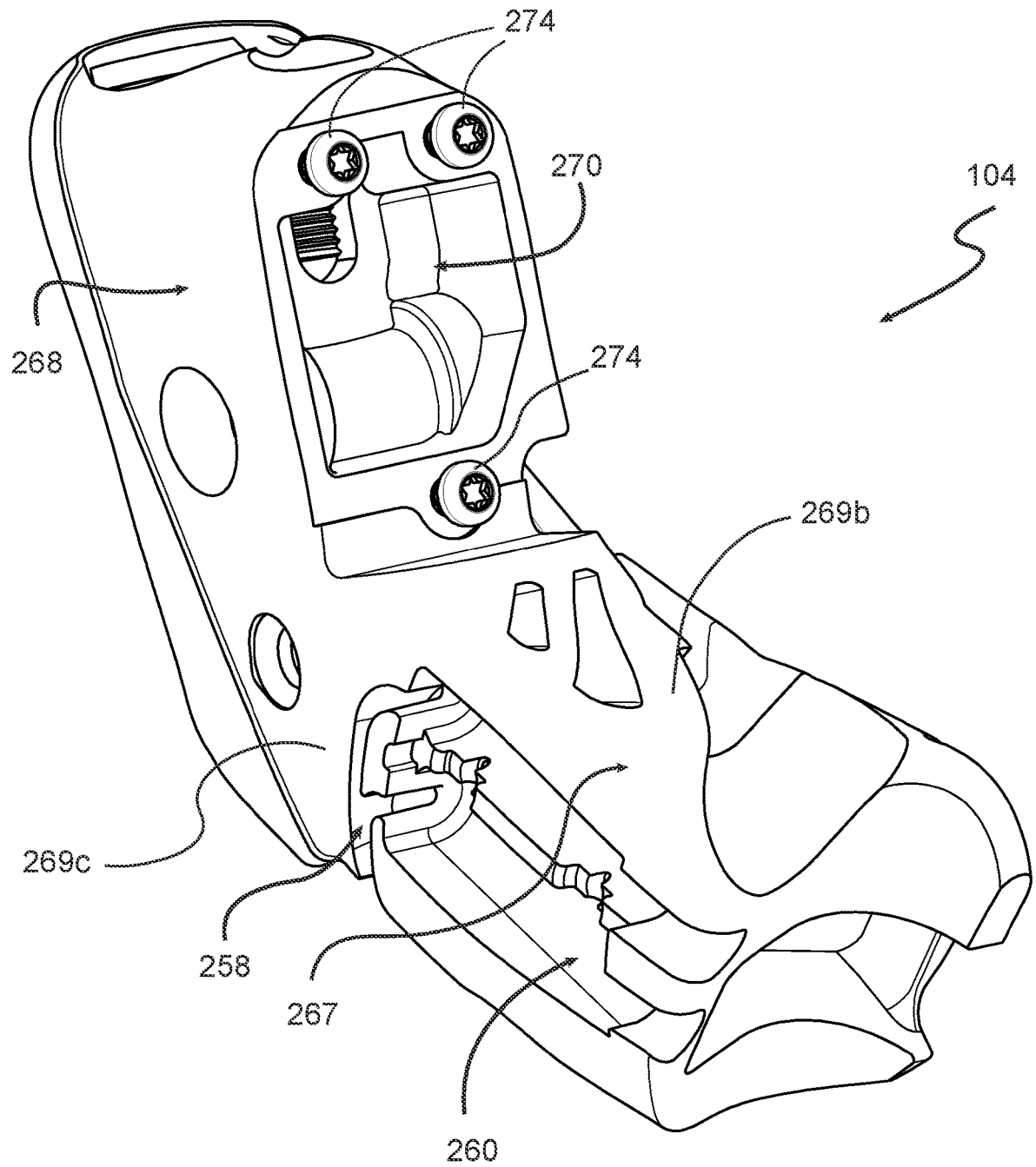
FIG. 22 shows a top perspective view of the housing portion of FIGS. 18-20.
Figure 23:
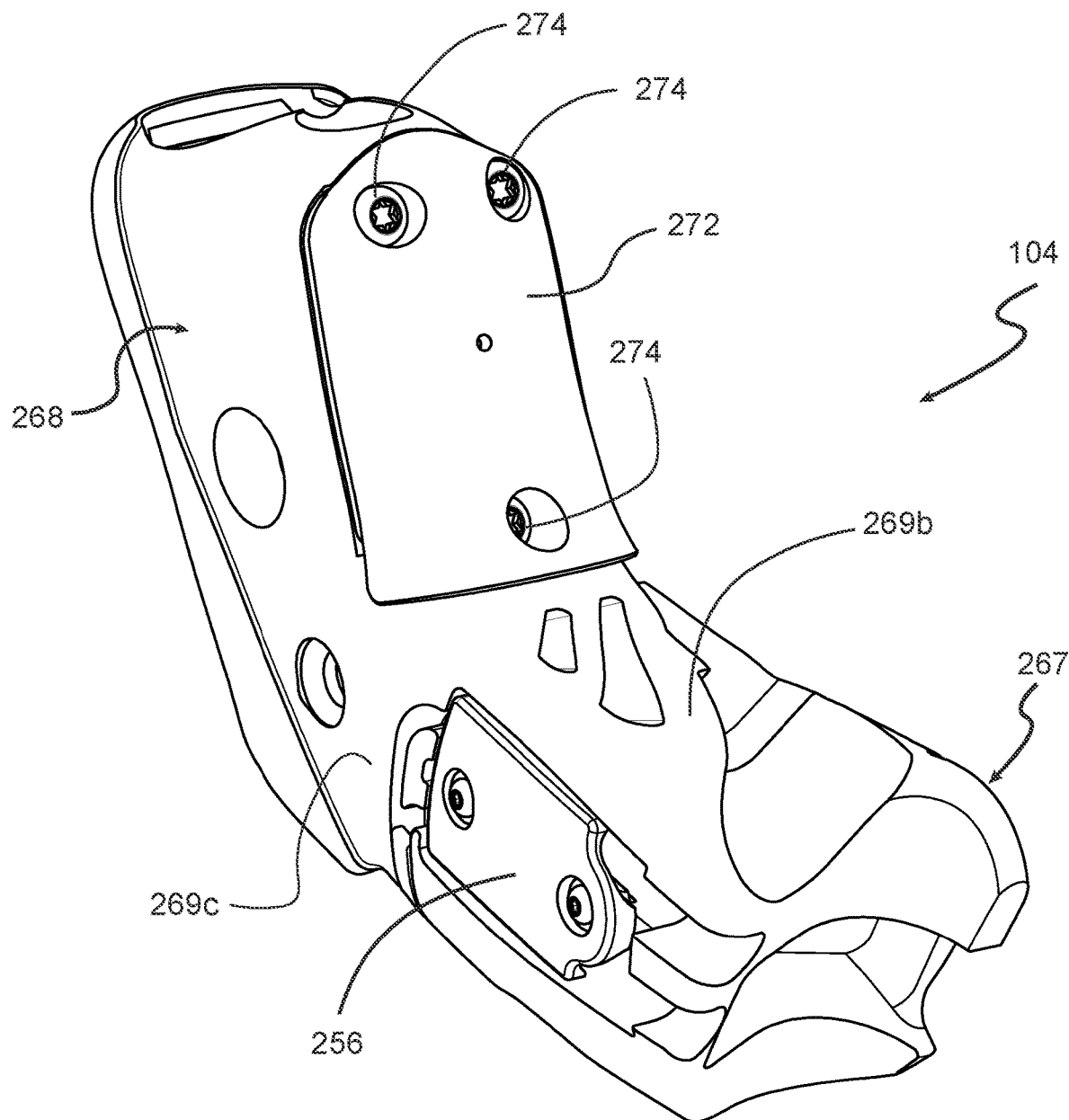
FIG. 23 shows the housing portion of FIG. 22, but with protective covers installed on parts or regions of the housing.

FIGS. 22 and 23 show a top view of the housing 104 with the outer cover 122 removed. FIG. 22 shows a chamber 270 in the housing where the brake lever 102 is connected to the hydraulic brake system components. The chamber 270 is accessible via a removable chamber cover 272, which is depicted in FIG. 23. The chamber cover 272 can be secured to the housing 104 by screws 274 or other fasters, snap connections, adhesive, or other suitable securing means. Though not described in significant detail herein, the chamber 270 may house and provide access to components of the control device 100 for maintenance or adjustment. When the outer cover 122 is attached to the housing 104, the chamber cover 272, jack cover 260 and battery cover 222 may all be covered and hidden and be protected from the environment.

Figure 21:
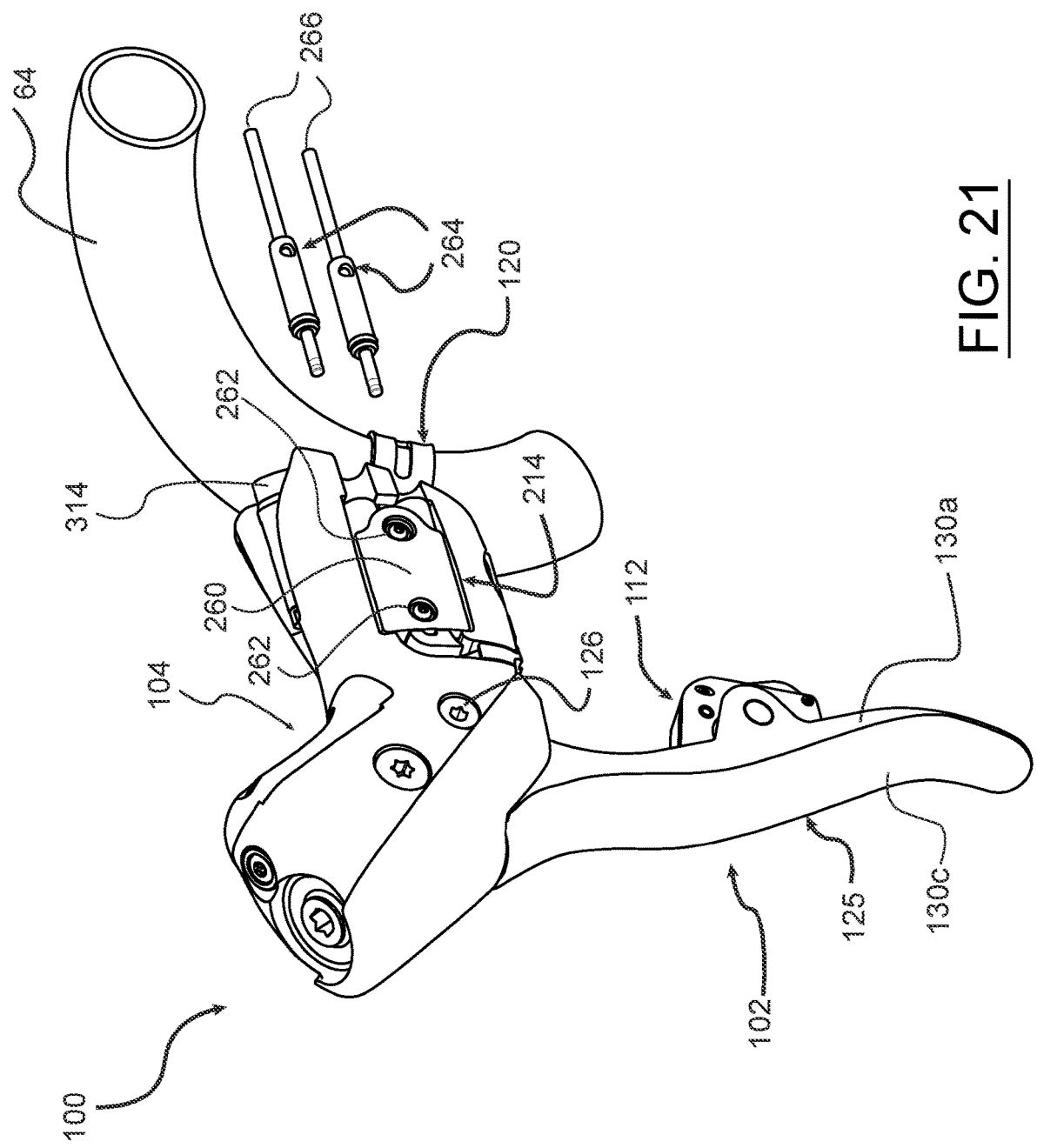
FIG. 21 shows an inside front perspective view of the bicycle control device of FIG. 7.

Referring to FIG. 17, the hydraulic brake system may generally include a housing bore with a master cylinder sleeve 300 inserted into the bore and configured to act as a master cylinder for the brake system. A piston 302 resides in and moves relative to the sleeve 300. The piston 302 includes one end 304 coupled to the brake lever 102 and is operable by movement of the brake lever as is known in the art. The master cylinder sleeve 300 is in fluid communication with the chamber 270, which can act as a brake fluid chamber for the brake system. The chamber 270 can include a bleed port 306 and a bleed screw 308 movable in the bleed port to fill, top off, or bleed hydraulic fluid of the brake system via the chamber 270. In this example, a compliant or flexible membrane 310 may be provided over and closing off the open side of the chamber 270 to provide a defined fluid chamber having a variable volume. The membrane 310 may be positioned between the cover 272 and the open side of the chamber 270, as depicted in FIG. 17. Referring to FIGS. 11 and 21, the housing 104 of the control device 100 may include a fluid outlet port 312 in communication with the master cylinder sleeve 300. As force is applied to move the brake lever 102, fluid may be forced to the fluid outlet port 312. The housing 104 of the control device may also include a control device fluid outlet 314 that is in fluid communication with the fluid outlet port 312. A hydraulic brake line 110 may be connected to the control device outlet port 314 and to the front or rea brake mechanism 106 or 108 for operation as is known in the art. In one example, the chamber cover 272 may be removed to replace or repair the flexible membrane 310.

Figure 24:
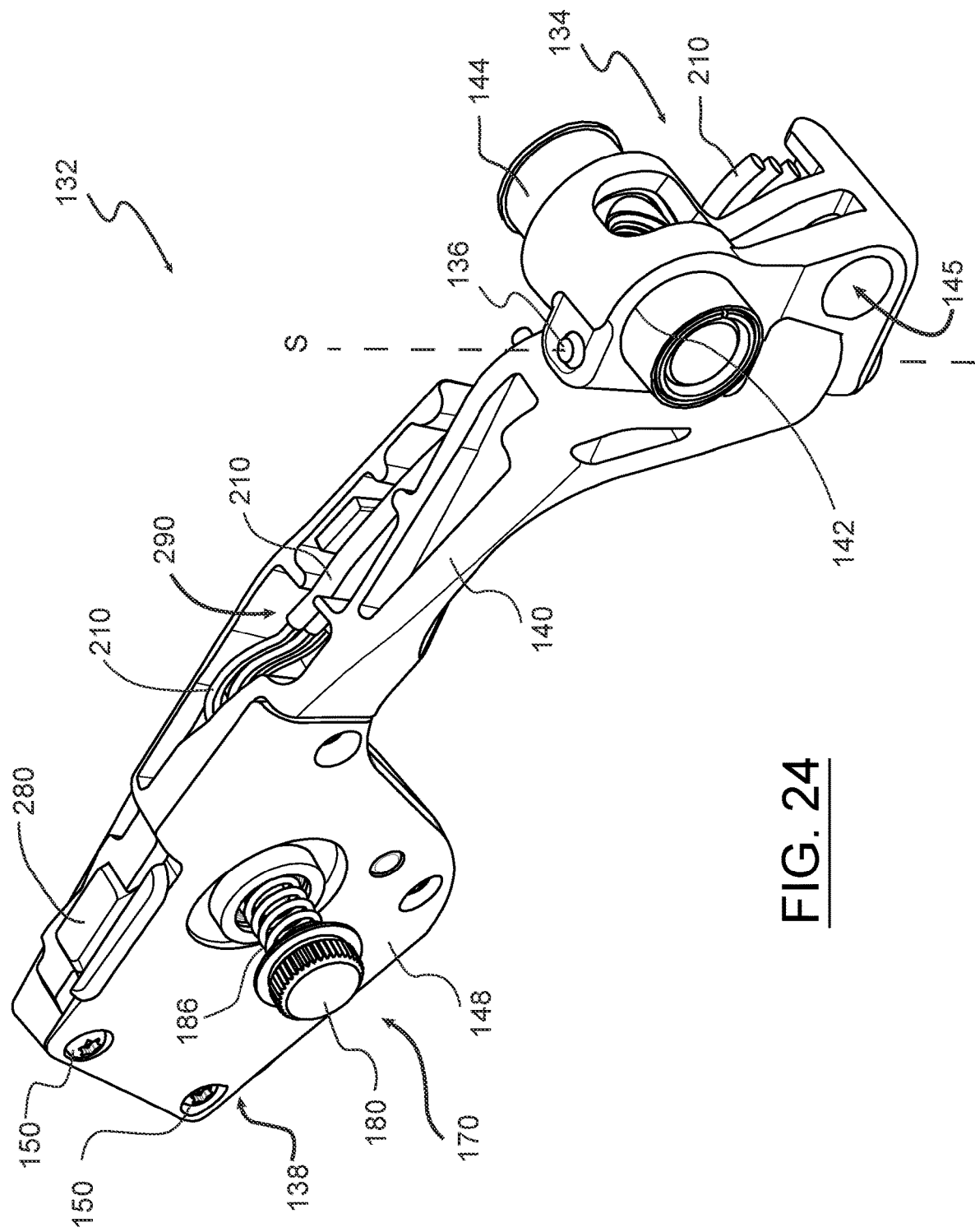
FIG. 24 shows an assembled perspective vie of the shift lever portion of the shift lever assembly of FIG. 14.
Figure 25:
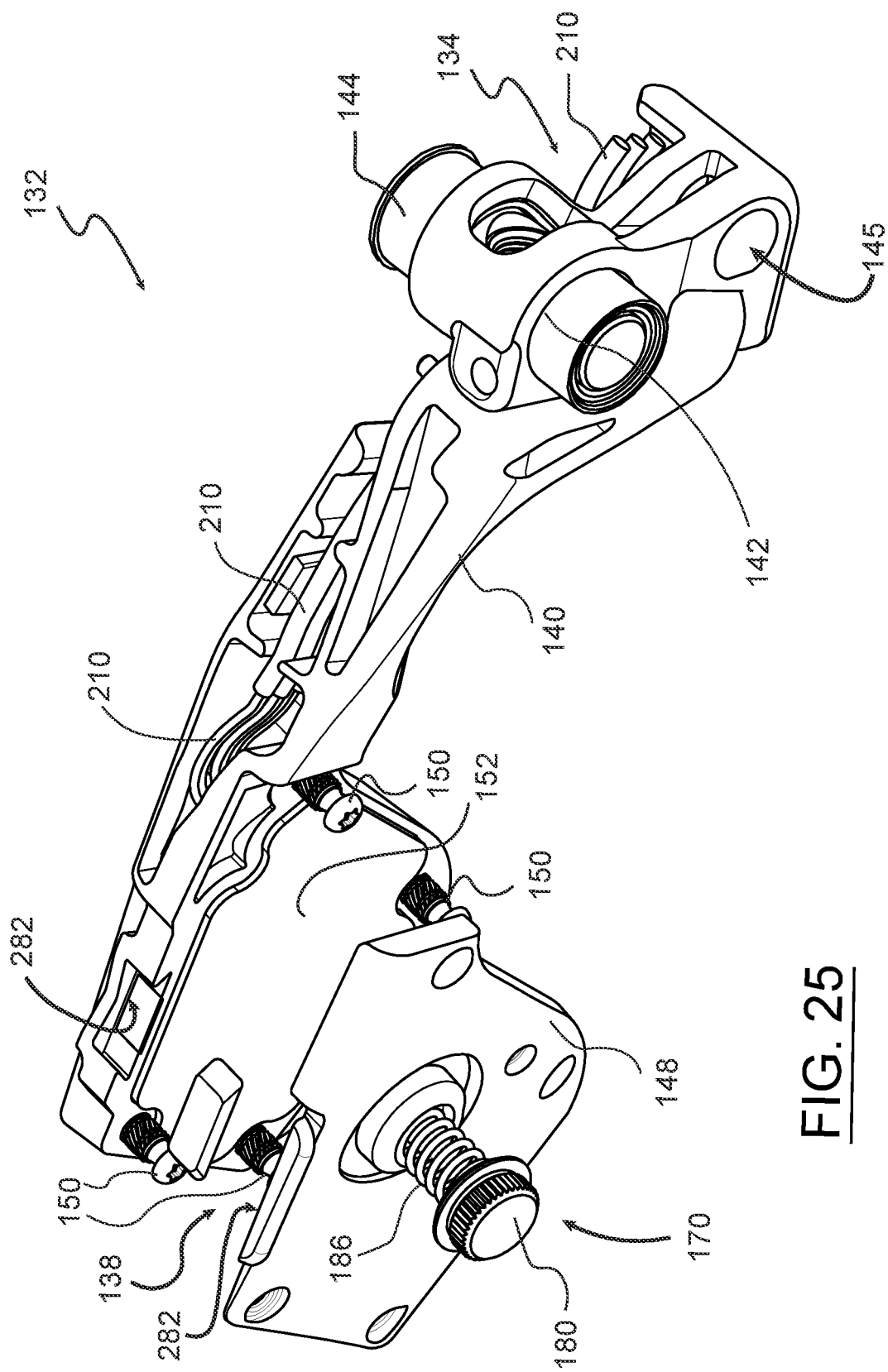
FIG. 25 shows a partial exploded view of the shift lever portion of FIG. 24.

FIGS. 24 and 25 show another aspect of the control device 100 according to the disclosure. In this example, a backer 280 can be inserted between and sandwiched by the cover 148 and the paddle end 138 of the shift lever 132. Each part can be formed to define a receiving portion, such as a pocket 282, that captures an edge of the backer 280. The backer 280 can create a contact point between the top of the shift lever 132 and a contact surface on the inside surface of the brake lever front wall 130c, as shown in FIG. 9. The contact surface can include a bump or protrusion 284 positioned to contact the backer 280. The backer 280 is essentially captured between the bump 284 on the brake lever inside surface 130c and the pocket 282 on the shift lever 132. The backer 280 can be formed from a durable material with low friction characteristics. In one example, the backer 280 can be made from a material different from the shift lever, such as Teflon, and then can be attached to the shift lever. The backer 280 can thus allow the shift lever 132 to slide laterally and easily relative to the brake lever 102 to inhibit binding and wear.

In the disclosed control device 100, the interior cavity 146 of the shift lever 132 contains the shift control system PCB 154 and a separate arm cavity 290, which extends along the lever arm 140. The lever arm 140 can be open along a forward side that is oriented facing the brake lever front wall 130c. The opening can open to the arm cavity 290, guides and retains the electrical cable assembly or wires 210 extending between the PCB 154 and the battery unit 212 and accessory jacks 216. The interior cavity 146 and the arm cavity 290 are joined via an internal hole (not shown) in the interior of the shift lever 132. These cavities could instead be joined via a slot. The cover 148 is fastened to the paddle end 138 of the shift lever 132, as described below, to provide a seal that prevents water and other contaminants from reaching the PCB 154. The electrical cable assembly, which consists of one or more independent wires 210, passes through the hole between the interior cavity 146 and the arm cavity 290. The arm cavity 290 is also filled with epoxy during assembly to both secure the wires 210 in place and provide a seal that prevents water and other contaminants from accessing the interior of the cable assembly and wires, the PCB 154, and the interior cavity 146.

As shown in FIG. 14, prior to the application of epoxy to the arm cavity 290, an epoxy blocker piece 292 can be installed at the location, i.e., the hole between the interior cavity 146 and the arm cavity 290. The epoxy blocker piece 292 provides a temporary seal that prevents epoxy from flowing into the circuit board cavity before solidifying. Once the shift lever assembly 112 is installed with the brake lever 102, the epoxy filled opening along the lever arm 140 faces the front wall 130c of the brake lever so that it would not be readily visible.

The disclosed control device 100 and the shift lever assembly 112 is configured such that the shift control system and battery unit are separated from the accessory jacks, even though the electronics are formed as one self-contained piece. The configuration results in several benefits. Also, the battery unit can be placed on a different side of the housing than the accessory jacks, which enables the use of a twisting battery cover with a deep coin slot. Further, the accessory jacks, battery unit, and primary shift control button assembly are all independently sealed against ingress of water or contaminants. Thus, moisture and contaminants are not able to travel from one subassembly to another within the device. Still further, no circuit board is exposed when the removable seals for the battery cover and accessory jacks are not in place. Thus, it is not possible for water or contaminants to damage the electrical shift control system when these seals are removed.

Another advantage is that the electrical cables or wires for the various components on the sides of the housing are routed around the exterior of the housing. This can improve the strength of the housing and can allow for complete assembly and installation of the electrical system components prior to installation on the housing. Still further, the shift control system only requires one circuit board located in the shift lever. Also, an epoxy seal is used at the interface of the electrical cables or wires and the shift control circuit board in the shift lever. This allows a multiple pin connector piece used to secure the wires to the circuit board to be installed prior to installing the cables or wires in the shift lever.

Although certain bicycle control device examples, features, aspects, components, and characteristics have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A control device mountable to a bicycle handlebar, the control device comprising:
   a housing sized and shaped to be grasped by a user's hand, the housing including a recess;
   a shift lever coupled to and movable relative to the housing;
   an electrical switch that can be actuated by movement of the shift lever;
   a controller in communication with the electrical switch, the controller configured to generate a signal in response to actuation of the electrical switch;
   a communication module configured to transmit the signal;
   a battery unit within the recess of the housing, the battery unit configured to contain a battery for providing power to the controller and the communication module; and
   a first connector and a second connector each having a first central axis and a second central axis, respectively, the first central axis and the second central axis defining a plane therethrough,
   wherein the battery unit and the recess are configured to position a diameter of the battery perpendicular to the plane.

2. The control device of claim 1, wherein the battery unit includes a battery cover and an opening, wherein the battery is positioned within the opening.

3. The control device of claim 2, wherein the battery cover closes off the opening.

4. The control device of claim 3, wherein the battery cover encloses a portion of the housing.

5. The control device of claim 4, wherein the battery cover is part of an external surface of the control device adjacent with the housing.

6. The control device of claim 3, wherein the battery cover is removeable.

7. The control device of claim 3, wherein the battery unit includes a sealing element configured to provide a moisture and contaminant proof seal when the battery cover is assembled.

8. The control device of claim 7, wherein the sealing element is an o-ring gasket.

9. The control device of claim 3, wherein the battery unit includes a battery case.

10. The control device of claim 9, wherein the battery cover is configured to be secured directly to the battery case.

11. The control device of claim 1, wherein the first connector and the second connector are configured to connect remote features to the control device.

12. The control device of claim 11, wherein the first connector and the second connector connect the remote features to the controller.

13. The control device of claim 11, wherein first connector and the second connector connect the remote features to the battery.

* * * * *